(12) United States Patent
Wikström et al.

(10) Patent No.: US 10,863,381 B2
(45) Date of Patent: Dec. 8, 2020

(54) TRANSPORT BLOCK SIZE DETERMINATION FOR SHORT TRANSMISSION TIME INTERVAL

(71) Applicant: Telefonaktiebolaget LM Ericsson (publ), Stockholm (SE)

(72) Inventors: Gustav Wikström, Täby (SE); Niklas Andgart, Södra Sandby (SE); Jingya Li, Gothenburg (SE); Henrik Sahlin, Mölnlycke (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 0 days.

(21) Appl. No.: 16/337,121

(22) PCT Filed: Sep. 26, 2017

(86) PCT No.: PCT/EP2017/074315
§ 371 (c)(1),
(2) Date: Mar. 27, 2019

(87) PCT Pub. No.: WO2018/060169
PCT Pub. Date: Apr. 5, 2018

(65) Prior Publication Data
US 2019/0223050 A1   Jul. 18, 2019

Related U.S. Application Data

(60) Provisional application No. 62/402,381, filed on Sep. 30, 2016.

(51) Int. Cl.
*H04W 28/06* (2009.01)
*H04L 1/00* (2006.01)
(Continued)

(52) U.S. Cl.
CPC .......... *H04W 28/06* (2013.01); *H04L 1/0003* (2013.01); *H04L 1/0061* (2013.01);
(Continued)

(58) Field of Classification Search
CPC ... H04L 1/0003; H04L 1/0025; H04L 1/0061; H04L 5/0023; H04L 5/0044; H04L 5/0053; H04L 5/0087; H04W 28/06
See application file for complete search history.

(56) References Cited

U.S. PATENT DOCUMENTS

2016/0065341 A1*  3/2016  Yoo .................. H04W 72/1273
                                                              370/336
2016/0066316 A1*  3/2016  Bhushan .......... H04W 72/0446
                                                              370/329
(Continued)

OTHER PUBLICATIONS

3rd Generation Partnership Project, "3rd Generation Partnership Project; Technical Specification Group Radio Access Network; Evolved Universal Terrestrial Radio Access (E-UTRA); Multiplexing and channel coding (Release 14)", Technical Specification, 3GPP TS 36.212 V14.0.0, Sep. 1, 2016, pp. 1-148, 3GPP, France.
(Continued)

*Primary Examiner* — Phuc H Tran
(74) *Attorney, Agent, or Firm* — Coats & Bennett, PLLC

(57) ABSTRACT

A method performed by a communication device comprises identifying (310) a long transmission time interval (TTI) transport block size from a set of long TTI transport block sizes used for transport block transmission within a long TTI. The method further comprises determining (320) a short TTI transport block size, used for transport block transmission within a short TTI, by downscaling the long TTI transport block size based on a relation between a number of symbols in the short TTI and a number of symbols in the long TTI that is greater than the number of symbols in the short TTI.

19 Claims, 14 Drawing Sheets

(51) Int. Cl.
*H04L 5/00* (2006.01)
*H04W 72/12* (2009.01)

(52) U.S. Cl.
CPC .......... *H04L 5/0044* (2013.01); *H04L 5/0053* (2013.01); *H04L 5/0087* (2013.01); *H04W 72/1205* (2013.01); *H04L 1/0025* (2013.01); *H04L 5/0023* (2013.01)

(56) References Cited

U.S. PATENT DOCUMENTS

| | | | | |
|---|---|---|---|---|
| 2018/0302900 | A1* | 10/2018 | Ibars Casas | H04L 5/0053 |
| 2018/0332603 | A1* | 11/2018 | Takeda | H04J 11/00 |
| 2019/0045440 | A1* | 2/2019 | Wu | H04W 52/0258 |
| 2019/0098653 | A9* | 3/2019 | Nory | H04L 5/14 |

OTHER PUBLICATIONS

3rd Generation Partnership Project, "3rd Generation Partnership Project; Technical Specification Group Radio Access Network; Evolved Universal Terrestrial Radio Access (E-UTRA); Physical layer procedures (Release 14)", Technical Specification, 3GPP TS 36.213 V14.0.0, Sep. 1, 2016, pp. 1-406, 3GPP, France.
ZTE Corporation, "TP of evaluation results for L2 overhead", 3GPP TSG-RAN W2 meeting #92, Anahaim, US, Nov. 16, 2015, pp. 1-8, R2-157031, 3GPP.
Ericsson, "TBS scaling for short TTI", 3GPP TSG-RAN W1 #86bis, Lisbon, Portugal, Oct. 10, 2016, pp. 1-5, R1-1610344, 3GPP.
Ericsson, Physical layer aspects of short TTI for uplink transmissions:, 3GPP TS RAN WG1 Meeting #84, Malta, Feb. 15, 2016, pp. 1-4, R1-160939, 3GPP.

* cited by examiner

FIG. 2

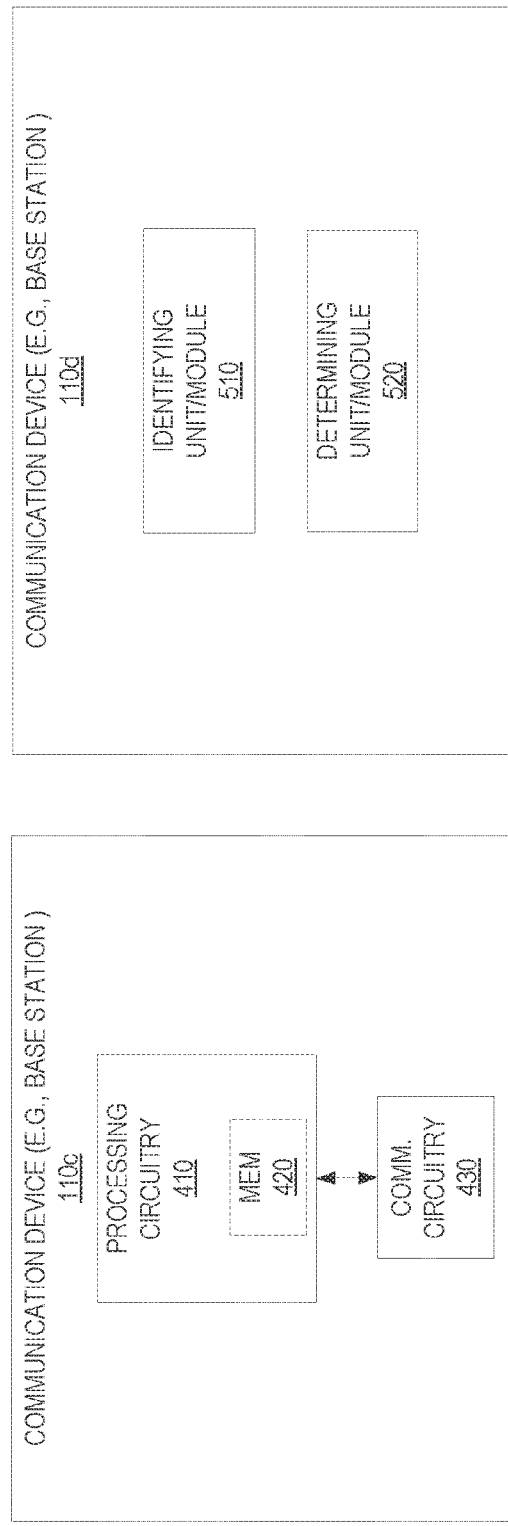

205

| 16 | 296 | 600 | 1096 | 1928 | 3240 | 6200 | 11832 | 22920 | 43816 |
|---|---|---|---|---|---|---|---|---|---|
| 24 | 328 | 616 | 1128 | 1992 | 3368 | 6456 | 12216 | 23688 | 45352 |
| 32 | 336 | 632 | 1160 | 2024 | 3496 | 6712 | 12576 | 24496 | 46888 |
| 40 | 344 | 648 | 1192 | 2088 | 3624 | 6968 | 12960 | 25456 | 48936 |
| 56 | 376 | 680 | 1224 | 2152 | 3752 | 7224 | 13536 | 26416 | 51024 |
| 72 | 392 | 696 | 1256 | 2216 | 3880 | 7480 | 14112 | 27376 | 52752 |
| 88 | 408 | 712 | 1288 | 2280 | 4008 | 7736 | 14688 | 28336 | 55056 |
| 104 | 424 | 744 | 1320 | 2344 | 4136 | 7992 | 15264 | 29296 | 57336 |
| 120 | 440 | 776 | 1352 | 2408 | 4264 | 8248 | 15840 | 30576 | 59256 |
| 136 | 456 | 808 | 1384 | 2472 | 4392 | 8504 | 16416 | 31704 | 61664 |
| 144 | 472 | 840 | 1416 | 2536 | 4584 | 8760 | 16992 | 32856 | 63776 |
| 152 | 488 | 872 | 1480 | 2600 | 4776 | 9144 | 17568 | 34008 | 66592 |
| 176 | 504 | 904 | 1544 | 2664 | 4968 | 9528 | 18336 | 35160 | 68808 |
| 208 | 520 | 936 | 1608 | 2728 | 5160 | 9912 | 19080 | 36696 | 71112 |
| 224 | 536 | 968 | 1672 | 2792 | 5352 | 10296 | 19848 | 37888 | 73712 |
| 256 | 552 | 1000 | 1736 | 2856 | 5544 | 10680 | 20616 | 39232 | 75376 |
| 280 | 568 | 1032 | 1800 | 2984 | 5736 | 11064 | 21384 | 40576 | |
| 288 | 584 | 1064 | 1864 | 3112 | 5992 | 11448 | 22152 | 42368 | |

210

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 0 | 16 | 32 | 56 | 88 | 120 | 152 | 176 | 208 | 224 | 256 |
| 1 | 24 | 56 | 88 | 144 | 176 | 208 | 224 | 256 | 328 | 344 |
| 2 | 32 | 72 | 144 | 176 | 208 | 256 | 296 | 328 | 376 | 424 |
| 3 | 40 | 104 | 176 | 208 | 256 | 328 | 392 | 440 | 504 | 568 |
| 4 | 56 | 120 | 208 | 256 | 328 | 408 | 488 | 552 | 632 | 696 |
| 5 | 72 | 144 | 224 | 328 | 424 | 504 | 600 | 680 | 776 | 872 |
| 6 | 328 | 176 | 256 | 392 | 504 | 600 | 712 | 808 | 936 | 1032 |
| 7 | 104 | 224 | 328 | 472 | 584 | 712 | 840 | 968 | 1096 | 1224 |
| 8 | 120 | 256 | 392 | 536 | 680 | 808 | 968 | 1096 | 1256 | 1384 |
| 9 | 136 | 296 | 456 | 616 | 776 | 936 | 1096 | 1256 | 1416 | 1544 |
| 10 | 144 | 328 | 504 | 680 | 872 | 1032 | 1224 | 1384 | 1544 | 1736 |
| 11 | 176 | 376 | 584 | 776 | 1000 | 1192 | 1384 | 1608 | 1800 | 2024 |
| 12 | 208 | 440 | 680 | 904 | 1128 | 1352 | 1608 | 1800 | 2024 | 2280 |
| 13 | 224 | 488 | 744 | 1000 | 1256 | 1544 | 1800 | 2024 | 2280 | 2536 |
| 14 | 256 | 552 | 840 | 1128 | 1416 | 1736 | 1992 | 2280 | 2600 | 2856 |
| 15 | 280 | 600 | 904 | 1224 | 1544 | 1800 | 2152 | 2472 | 2728 | 3112 |
| 16 | 328 | 632 | 968 | 1288 | 1608 | 1928 | 2280 | 2600 | 2984 | 3240 |
| 17 | 336 | 696 | 1064 | 1416 | 1800 | 2152 | 2536 | 2856 | 3240 | 3624 |
| 18 | 376 | 776 | 1160 | 1544 | 1992 | 2344 | 2792 | 3112 | 3624 | 4008 |
| 19 | 408 | 840 | 1288 | 1736 | 2152 | 2600 | 2984 | 3496 | 3880 | 4264 |
| 20 | 440 | 904 | 1384 | 1864 | 2344 | 2792 | 3240 | 3752 | 4136 | 4584 |
| 21 | 488 | 1000 | 1480 | 1992 | 2472 | 2984 | 3496 | 4008 | 4584 | 4968 |
| 22 | 520 | 1064 | 1608 | 2152 | 2664 | 3240 | 3752 | 4264 | 4776 | 5352 |
| 23 | 552 | 1128 | 1736 | 2280 | 2856 | 3496 | 4008 | 4584 | 5160 | 5736 |
| 24 | 584 | 1192 | 1800 | 2408 | 2984 | 3624 | 4264 | 4968 | 5544 | 5992 |
| 25 | 616 | 1256 | 1864 | 2536 | 3112 | 3752 | 4392 | 5160 | 5736 | 6200 |
| 26 | 712 | 1480 | 2216 | 2984 | 3752 | 4392 | 5160 | 5992 | 6712 | 7480 |
| 26A | 632 | 1288 | 1928 | 2600 | 3240 | 3880 | 4584 | 5160 | 5992 | 6456 |

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 0 | 288 | 328 | 344 | 376 | 392 | 424 | 456 | 488 | 504 | 536 |
| 1 | 376 | 424 | 456 | 488 | 520 | 568 | 600 | 632 | 680 | 712 |
| 2 | 472 | 520 | 568 | 616 | 648 | 696 | 744 | 776 | 840 | 872 |
| 3 | 616 | 680 | 744 | 808 | 872 | 904 | 968 | 1032 | 1096 | 1160 |
| 4 | 776 | 840 | 904 | 1000 | 1064 | 1128 | 1192 | 1288 | 1352 | 1416 |
| 5 | 968 | 1032 | 1128 | 1224 | 1320 | 1384 | 1480 | 1544 | 1672 | 1736 |
| 6 | 1128 | 1224 | 1352 | 1480 | 1544 | 1672 | 1736 | 1864 | 1992 | 2088 |
| 7 | 1320 | 1480 | 1608 | 1672 | 1800 | 1928 | 2088 | 2216 | 2344 | 2472 |
| 8 | 1544 | 1672 | 1800 | 1928 | 2088 | 2216 | 2344 | 2536 | 2664 | 2792 |
| 9 | 1736 | 1864 | 2024 | 2216 | 2344 | 2536 | 2664 | 2856 | 2984 | 3112 |
| 10 | 1928 | 2088 | 2280 | 2472 | 2664 | 2792 | 2984 | 3112 | 3368 | 3496 |
| 11 | 2216 | 2408 | 2600 | 2792 | 2984 | 3240 | 3496 | 3624 | 3880 | 4008 |
| 12 | 2472 | 2728 | 2984 | 3240 | 3368 | 3624 | 3880 | 4136 | 4392 | 4584 |
| 13 | 2856 | 3112 | 3368 | 3624 | 3880 | 4136 | 4392 | 4584 | 4968 | 5160 |
| 14 | 3112 | 3496 | 3752 | 4008 | 4264 | 4584 | 4968 | 5160 | 5544 | 5736 |
| 15 | 3368 | 3624 | 4008 | 4264 | 4584 | 4968 | 5160 | 5544 | 5736 | 6200 |
| 16 | 3624 | 3880 | 4264 | 4584 | 4968 | 5160 | 5544 | 5992 | 6200 | 6456 |
| 17 | 4008 | 4392 | 4776 | 5160 | 5352 | 5736 | 6200 | 6456 | 6712 | 7224 |
| 18 | 4392 | 4776 | 5160 | 5544 | 5992 | 6200 | 6712 | 7224 | 7480 | 7992 |
| 19 | 4776 | 5160 | 5544 | 5992 | 6456 | 6968 | 7224 | 7736 | 8248 | 8504 |
| 20 | 5160 | 5544 | 5992 | 6456 | 6968 | 7480 | 7992 | 8248 | 8760 | 9144 |
| 21 | 5544 | 5992 | 6456 | 6968 | 7480 | 7992 | 8504 | 9144 | 9528 | 9912 |
| 22 | 5992 | 6456 | 6968 | 7480 | 7992 | 8504 | 9144 | 9528 | 10296 | 10680 |
| 23 | 6200 | 6968 | 7480 | 7992 | 8504 | 9144 | 9912 | 10296 | 11064 | 11448 |

FIG. 8A

| | | | | | | | | | |
|---|---|---|---|---|---|---|---|---|---|
| 24 | 6712 | 7224 | 7992 | 8504 | 9144 | 9912 | 10296 | 11064 | 11448 | 12216 |
| 25 | 6968 | 7480 | 8248 | 8760 | 9528 | 10296 | 10680 | 11448 | 12216 | 12576 |
| 26 | 8248 | 8760 | 9528 | 10296 | 11064 | 11832 | 12576 | 13536 | 14112 | 14688 |
| 26A | 7224 | 7736 | 8504 | 9144 | 9912 | 10296 | 11064 | 11832 | 12576 | 12960 |

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 0 | 568 | 600 | 616 | 648 | 680 | 712 | 744 | 776 | 776 | 808 |
| 1 | 744 | 776 | 808 | 872 | 904 | 936 | 968 | 1000 | 1032 | 1064 |
| 2 | 936 | 968 | 1000 | 1064 | 1096 | 1160 | 1192 | 1256 | 1288 | 1320 |
| 3 | 1224 | 1256 | 1320 | 1384 | 1416 | 1480 | 1544 | 1608 | 1672 | 1736 |
| 4 | 1480 | 1544 | 1608 | 1736 | 1800 | 1864 | 1928 | 1992 | 2088 | 2152 |
| 5 | 1864 | 1928 | 2024 | 2088 | 2216 | 2280 | 2344 | 2472 | 2536 | 2664 |
| 6 | 2216 | 2280 | 2408 | 2472 | 2600 | 2728 | 2792 | 2984 | 2984 | 3112 |
| 7 | 2536 | 2664 | 2792 | 2984 | 3112 | 3240 | 3368 | 3368 | 3496 | 3624 |
| 8 | 2984 | 3112 | 3240 | 3368 | 3496 | 3624 | 3752 | 3880 | 4008 | 4264 |
| 9 | 3368 | 3496 | 3624 | 3752 | 4008 | 4136 | 4264 | 4392 | 4584 | 4776 |
| 10 | 3752 | 3880 | 4008 | 4264 | 4392 | 4584 | 4776 | 4968 | 5160 | 5352 |
| 11 | 4264 | 4392 | 4584 | 4776 | 4968 | 5352 | 5544 | 5736 | 5992 | 5992 |
| 12 | 4776 | 4968 | 5352 | 5544 | 5736 | 5992 | 6200 | 6456 | 6712 | 6712 |
| 13 | 5352 | 5736 | 5992 | 6200 | 6456 | 6712 | 6968 | 7224 | 7480 | 7736 |
| 14 | 5992 | 6200 | 6456 | 6968 | 7224 | 7480 | 7736 | 7992 | 8248 | 8504 |
| 15 | 6456 | 6712 | 6968 | 7224 | 7736 | 7992 | 8248 | 8504 | 8760 | 9144 |
| 16 | 6712 | 7224 | 7480 | 7736 | 7992 | 8504 | 8760 | 9144 | 9528 | 9912 |
| 17 | 7480 | 7992 | 8248 | 8760 | 9144 | 9528 | 9912 | 10296 | 10296 | 10680 |
| 18 | 8248 | 8760 | 9144 | 9528 | 9912 | 10296 | 10680 | 11064 | 11448 | 11832 |
| 19 | 9144 | 9528 | 9912 | 10296 | 10680 | 11064 | 11448 | 12216 | 12576 | 12960 |
| 20 | 9912 | 10296 | 10680 | 11064 | 11448 | 12216 | 12576 | 12960 | 13536 | 14112 |
| 21 | 10680 | 11064 | 11448 | 12216 | 12576 | 12960 | 13536 | 14112 | 14688 | 15264 |
| 22 | 11448 | 11832 | 12576 | 12960 | 13536 | 14112 | 14688 | 15264 | 15840 | 16416 |
| 23 | 12216 | 12576 | 12960 | 13536 | 14112 | 14688 | 15264 | 15840 | 16416 | 16992 |
| 24 | 12960 | 13536 | 14112 | 14688 | 15264 | 15840 | 16416 | 16992 | 17568 | 18336 |
| 25 | 13536 | 14112 | 14688 | 15264 | 15840 | 16416 | 16992 | 17568 | 18336 | 19080 |
| 26 | 15264 | 16416 | 16992 | 17568 | 18336 | 19080 | 19848 | 20616 | 21384 | 22152 |
| 26A | 13536 | 14112 | 15264 | 15840 | 16416 | 16992 | 17568 | 18336 | 19080 | 19848 |

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 0 | 840 | 872 | 904 | 936 | 968 | 1000 | 1032 | 1032 | 1064 | 1096 |
| 1 | 1128 | 1160 | 1192 | 1224 | 1256 | 1288 | 1352 | 1384 | 1416 | 1416 |
| 2 | 1384 | 1416 | 1480 | 1544 | 1544 | 1608 | 1672 | 1672 | 1736 | 1800 |
| 3 | 1800 | 1864 | 1928 | 1992 | 2024 | 2088 | 2152 | 2216 | 2280 | 2344 |
| 4 | 2216 | 2280 | 2344 | 2408 | 2472 | 2600 | 2664 | 2728 | 2792 | 2856 |
| 5 | 2728 | 2792 | 2856 | 2984 | 3112 | 3112 | 3240 | 3368 | 3496 | 3496 |
| 6 | 3240 | 3368 | 3496 | 3496 | 3624 | 3752 | 3880 | 4008 | 4136 | 4136 |
| 7 | 3752 | 3880 | 4008 | 4136 | 4264 | 4392 | 4584 | 4584 | 4776 | 4968 |
| 8 | 4392 | 4584 | 4584 | 4776 | 4968 | 4968 | 5160 | 5352 | 5544 | 5544 |
| 9 | 4968 | 5160 | 5160 | 5352 | 5544 | 5736 | 5736 | 5992 | 6200 | 6200 |
| 10 | 5544 | 5736 | 5736 | 5992 | 6200 | 6200 | 6456 | 6712 | 6712 | 6968 |
| 11 | 6200 | 6456 | 6712 | 6968 | 6968 | 7224 | 7480 | 7736 | 7736 | 7992 |
| 12 | 6968 | 7224 | 7480 | 7736 | 7992 | 8248 | 8504 | 8760 | 8760 | 9144 |
| 13 | 7992 | 8248 | 8504 | 8760 | 9144 | 9144 | 9528 | 9912 | 9912 | 10296 |
| 14 | 8760 | 9144 | 9528 | 9912 | 9912 | 10296 | 10680 | 11064 | 11064 | 11448 |
| 15 | 9528 | 9912 | 10296 | 10296 | 10680 | 11064 | 11448 | 11832 | 11832 | 12216 |
| 16 | 9912 | 10296 | 10680 | 11064 | 11448 | 11832 | 12216 | 12216 | 12576 | 12960 |
| 17 | 11064 | 11448 | 11832 | 12216 | 12576 | 12960 | 13536 | 13536 | 14112 | 14688 |
| 18 | 12216 | 12576 | 12960 | 13536 | 14112 | 14112 | 14688 | 15264 | 15264 | 15840 |
| 19 | 13536 | 13536 | 14112 | 14688 | 15264 | 15264 | 15840 | 16416 | 16992 | 16992 |
| 20 | 14688 | 14688 | 15264 | 15840 | 16416 | 16992 | 16992 | 17568 | 18336 | 18336 |
| 21 | 15840 | 15840 | 16416 | 16992 | 17568 | 18336 | 18336 | 19080 | 19848 | 19848 |
| 22 | 16992 | 16992 | 17568 | 18336 | 19080 | 19080 | 19848 | 20616 | 21384 | 21384 |
| 23 | 17568 | 18336 | 19080 | 19848 | 19848 | 20616 | 21384 | 22152 | 22152 | 22920 |
| 24 | 19080 | 19848 | 19848 | 20616 | 21384 | 22152 | 22920 | 22920 | 23688 | 24496 |
| 25 | 19848 | 20616 | 20616 | 21384 | 22152 | 22920 | 23688 | 24496 | 24496 | 25456 |
| 26 | 22920 | 23688 | 24496 | 25456 | 25456 | 26416 | 27376 | 28336 | 29296 | 29296 |

FIG. 8B

| 26A | 20616 | 20616 | 21384 | 22152 | 22920 | 23688 | 24496 | 24496 | 25456 | 26416 |

| $I_{TBS}$ | \multicolumn{10}{c}{$N_{PRB}$} |
|---|---|---|---|---|---|---|---|---|---|---|
|  | 41 | 42 | 43 | 44 | 45 | 46 | 47 | 48 | 49 | 50 |
| 0 | 1128 | 1160 | 1192 | 1224 | 1256 | 1256 | 1288 | 1320 | 1352 | 1384 |
| 1 | 1480 | 1544 | 1544 | 1608 | 1608 | 1672 | 1736 | 1736 | 1800 | 1800 |
| 2 | 1800 | 1864 | 1928 | 1992 | 2024 | 2088 | 2088 | 2152 | 2216 | 2216 |
| 3 | 2408 | 2472 | 2536 | 2536 | 2600 | 2664 | 2728 | 2792 | 2856 | 2856 |
| 4 | 2984 | 2984 | 3112 | 3112 | 3240 | 3240 | 3368 | 3496 | 3496 | 3624 |
| 5 | 3624 | 3752 | 3752 | 3880 | 4008 | 4008 | 4136 | 4264 | 4392 | 4392 |
| 6 | 4264 | 4392 | 4584 | 4584 | 4776 | 4776 | 4968 | 4968 | 5160 | 5160 |
| 7 | 4968 | 5160 | 5352 | 5352 | 5544 | 5736 | 5736 | 5992 | 5992 | 6200 |
| 8 | 5736 | 5992 | 5992 | 6200 | 6200 | 6456 | 6456 | 6712 | 6968 | 6968 |
| 9 | 6456 | 6712 | 6712 | 6968 | 6968 | 7224 | 7480 | 7480 | 7736 | 7992 |
| 10 | 7224 | 7480 | 7480 | 7736 | 7992 | 7992 | 8248 | 8504 | 8504 | 8760 |
| 11 | 8248 | 8504 | 8760 | 8760 | 9144 | 9144 | 9528 | 9528 | 9912 | 9912 |
| 12 | 9528 | 9528 | 9912 | 9912 | 10296 | 10680 | 10680 | 11064 | 11064 | 11448 |
| 13 | 10680 | 10680 | 11064 | 11448 | 11448 | 11832 | 12216 | 12216 | 12576 | 12960 |
| 14 | 11832 | 12216 | 12216 | 12576 | 12960 | 12960 | 13536 | 13536 | 14112 | 14112 |
| 15 | 12576 | 12960 | 12960 | 13536 | 13536 | 14112 | 14688 | 14688 | 15264 | 15264 |
| 16 | 13536 | 13536 | 14112 | 14112 | 14688 | 14688 | 15264 | 15840 | 15840 | 16416 |
| 17 | 14688 | 15264 | 15264 | 15840 | 16416 | 16416 | 16992 | 17568 | 17568 | 18336 |
| 18 | 16416 | 16416 | 16992 | 17568 | 17568 | 18336 | 18336 | 19080 | 19080 | 19848 |
| 19 | 17568 | 18336 | 18336 | 19080 | 19080 | 19848 | 20616 | 20616 | 21384 | 21384 |
| 20 | 19080 | 19848 | 19848 | 20616 | 20616 | 21384 | 22152 | 22152 | 22920 | 22920 |
| 21 | 20616 | 21384 | 21384 | 22152 | 22920 | 22920 | 23688 | 24496 | 24496 | 25456 |
| 22 | 22152 | 22920 | 22920 | 23688 | 24496 | 24496 | 25456 | 25456 | 26416 | 27376 |
| 23 | 23688 | 24496 | 24496 | 25456 | 25456 | 26416 | 27376 | 27376 | 28336 | 28336 |
| 24 | 25456 | 25456 | 26416 | 26416 | 27376 | 28336 | 28336 | 29296 | 29296 | 30576 |
| 25 | 26416 | 26416 | 27376 | 28336 | 28336 | 29296 | 29296 | 30576 | 31704 | 31704 |
| 26 | 30576 | 30576 | 31704 | 32856 | 32856 | 34008 | 35160 | 35160 | 36696 | 36696 |
| 26A | 26416 | 27376 | 27376 | 29296 | 29296 | 29296 | 30576 | 30576 | 31704 | 32856 |

| $I_{TBS}$ | \multicolumn{10}{c}{$N_{PRB}$} |
|---|---|---|---|---|---|---|---|---|---|---|
|  | 51 | 52 | 53 | 54 | 55 | 56 | 57 | 58 | 59 | 60 |
| 0 | 1416 | 1416 | 1480 | 1480 | 1544 | 1544 | 1608 | 1608 | 1608 | 1672 |
| 1 | 1864 | 1864 | 1928 | 1992 | 1992 | 2024 | 2088 | 2088 | 2152 | 2152 |
| 2 | 2280 | 2344 | 2344 | 2408 | 2472 | 2536 | 2536 | 2600 | 2664 | 2664 |
| 3 | 2984 | 2984 | 3112 | 3112 | 3240 | 3240 | 3368 | 3368 | 3496 | 3496 |
| 4 | 3624 | 3752 | 3752 | 3880 | 4008 | 4008 | 4136 | 4136 | 4264 | 4264 |
| 5 | 4584 | 4584 | 4776 | 4776 | 4776 | 4968 | 4968 | 5160 | 5160 | 5352 |
| 6 | 5352 | 5352 | 5544 | 5736 | 5736 | 5992 | 5992 | 5992 | 6200 | 6200 |
| 7 | 6200 | 6456 | 6456 | 6712 | 6712 | 6712 | 6968 | 6968 | 7224 | 7224 |
| 8 | 7224 | 7224 | 7480 | 7480 | 7736 | 7736 | 7992 | 7992 | 8248 | 8504 |
| 9 | 7992 | 8248 | 8248 | 8504 | 8760 | 8760 | 9144 | 9144 | 9144 | 9528 |
| 10 | 9144 | 9144 | 9144 | 9528 | 9528 | 9912 | 9912 | 10296 | 10296 | 10680 |
| 11 | 10296 | 10680 | 10680 | 11064 | 11064 | 11448 | 11448 | 11832 | 11832 | 12216 |
| 12 | 11832 | 11832 | 12216 | 12216 | 12576 | 12576 | 12960 | 12960 | 13536 | 13536 |
| 13 | 12960 | 13536 | 13536 | 14112 | 14112 | 14688 | 14688 | 14688 | 15264 | 15264 |
| 14 | 14688 | 14688 | 15264 | 15264 | 15840 | 15840 | 16416 | 16416 | 16992 | 16992 |
| 15 | 15840 | 15840 | 16416 | 16992 | 16992 | 16992 | 17568 | 17568 | 18336 | 18336 |
| 16 | 16416 | 16992 | 16992 | 17568 | 17568 | 18336 | 18336 | 19080 | 19080 | 19848 |
| 17 | 18336 | 19080 | 19080 | 19848 | 19848 | 20616 | 20616 | 20616 | 21384 | 21384 |
| 18 | 19848 | 20616 | 21384 | 21384 | 22152 | 22152 | 22920 | 22920 | 23688 | 23688 |
| 19 | 22152 | 22152 | 22920 | 22920 | 23688 | 24496 | 24496 | 25456 | 25456 | 25456 |
| 20 | 23688 | 24496 | 24496 | 25456 | 25456 | 26416 | 26416 | 27376 | 27376 | 28336 |
| 21 | 25456 | 26416 | 26416 | 27376 | 27376 | 28336 | 28336 | 29296 | 29296 | 30576 |
| 22 | 27376 | 28336 | 28336 | 29296 | 29296 | 30576 | 30576 | 31704 | 31704 | 32856 |
| 23 | 29296 | 29296 | 30576 | 30576 | 31704 | 31704 | 32856 | 32856 | 34008 | 34008 |
| 24 | 31704 | 31704 | 32856 | 32856 | 34008 | 34008 | 35160 | 35160 | 36696 | 36696 |
| 25 | 32856 | 32856 | 34008 | 34008 | 35160 | 35160 | 36696 | 36696 | 37888 | 37888 |
| 26 | 37888 | 37888 | 39232 | 40576 | 40576 | 40576 | 42368 | 42368 | 43816 | 43816 |
| 26A | 32856 | 34008 | 34008 | 35160 | 36696 | 36696 | 36696 | 37888 | 37888 | 39232 |

FIG. 8C

| $I_{TBS}$ | \multicolumn{10}{c|}{$N_{PRB}$} |
|---|---|---|---|---|---|---|---|---|---|---|
|  | 61 | 62 | 63 | 64 | 65 | 66 | 67 | 68 | 69 | 70 |
| 0 | 1672 | 1736 | 1736 | 1800 | 1800 | 1800 | 1864 | 1864 | 1928 | 1928 |
| 1 | 2216 | 2280 | 2280 | 2344 | 2344 | 2408 | 2472 | 2472 | 2536 | 2536 |
| 2 | 2728 | 2792 | 2856 | 2856 | 2856 | 2984 | 2984 | 3112 | 3112 | 3112 |
| 3 | 3624 | 3624 | 3624 | 3752 | 3752 | 3880 | 3880 | 4008 | 4008 | 4136 |
| 4 | 4392 | 4392 | 4584 | 4584 | 4584 | 4776 | 4776 | 4968 | 4968 | 4968 |
| 5 | 5352 | 5544 | 5544 | 5736 | 5736 | 5736 | 5992 | 5992 | 5992 | 6200 |
| 6 | 6456 | 6456 | 6456 | 6712 | 6712 | 6968 | 6968 | 6968 | 7224 | 7224 |
| 7 | 7480 | 7480 | 7736 | 7736 | 7992 | 7992 | 8248 | 8248 | 8504 | 8504 |
| 8 | 8504 | 8760 | 8760 | 9144 | 9144 | 9144 | 9528 | 9528 | 9528 | 9912 |
| 9 | 9528 | 9912 | 9912 | 10296 | 10296 | 10296 | 10680 | 10680 | 11064 | 11064 |
| 10 | 10680 | 11064 | 11064 | 11448 | 11448 | 11448 | 11832 | 11832 | 12216 | 12216 |
| 11 | 12216 | 12576 | 12576 | 12960 | 12960 | 13536 | 13536 | 13536 | 14112 | 14112 |
| 12 | 14112 | 14112 | 14112 | 14688 | 14688 | 15264 | 15264 | 15264 | 15840 | 15840 |
| 13 | 15840 | 15840 | 16416 | 16416 | 16992 | 16992 | 16992 | 17568 | 17568 | 18336 |
| 14 | 17568 | 17568 | 18336 | 18336 | 18336 | 19080 | 19080 | 19848 | 19848 | 19848 |
| 15 | 18336 | 19080 | 19080 | 19848 | 19848 | 20616 | 20616 | 20616 | 21384 | 21384 |
| 16 | 19848 | 19848 | 20616 | 20616 | 21384 | 21384 | 22152 | 22152 | 22152 | 22920 |
| 17 | 22152 | 22152 | 22920 | 22920 | 23688 | 23688 | 24496 | 24496 | 24496 | 25456 |
| 18 | 24496 | 24496 | 24496 | 25456 | 25456 | 26416 | 26416 | 27376 | 27376 | 27376 |
| 19 | 26416 | 26416 | 27376 | 27376 | 28336 | 28336 | 29296 | 29296 | 29296 | 30576 |
| 20 | 28336 | 29296 | 29296 | 29296 | 30576 | 30576 | 31704 | 31704 | 31704 | 32856 |
| 21 | 30576 | 31704 | 31704 | 31704 | 32856 | 32856 | 34008 | 34008 | 35160 | 35160 |
| 22 | 32856 | 34008 | 34008 | 34008 | 35160 | 35160 | 36696 | 36696 | 36696 | 37888 |
| 23 | 35160 | 35160 | 36696 | 36696 | 37888 | 37888 | 37888 | 39232 | 39232 | 40576 |
| 24 | 36696 | 37888 | 37888 | 39232 | 39232 | 40576 | 40576 | 42368 | 42368 | 42368 |
| 25 | 39232 | 39232 | 40576 | 40576 | 40576 | 42368 | 42368 | 43816 | 43816 | 43816 |
| 26 | 45352 | 45352 | 46888 | 46888 | 48936 | 48936 | 48936 | 51024 | 51024 | 52752 |
| 26A | 40576 | 40576 | 40576 | 40576 | 42368 | 42368 | 43816 | 43816 | 45352 | 45352 |

| $I_{TBS}$ | \multicolumn{10}{c|}{$N_{PRB}$} |
|---|---|---|---|---|---|---|---|---|---|---|
|  | 71 | 72 | 73 | 74 | 75 | 76 | 77 | 78 | 79 | 80 |
| 0 | 1992 | 1992 | 2024 | 2088 | 2088 | 2088 | 2152 | 2152 | 2216 | 2216 |
| 1 | 2600 | 2600 | 2664 | 2728 | 2728 | 2792 | 2792 | 2856 | 2856 | 2856 |
| 2 | 3240 | 3240 | 3368 | 3368 | 3368 | 3496 | 3496 | 3496 | 3496 | 3624 |
| 3 | 4136 | 4264 | 4264 | 4392 | 4392 | 4392 | 4584 | 4584 | 4584 | 4776 |
| 4 | 5160 | 5160 | 5160 | 5352 | 5352 | 5544 | 5544 | 5544 | 5736 | 5736 |
| 5 | 6200 | 6200 | 6456 | 6456 | 6712 | 6712 | 6712 | 6968 | 6968 | 6968 |
| 6 | 7480 | 7480 | 7736 | 7736 | 7736 | 7992 | 7992 | 8248 | 8248 | 8248 |
| 7 | 8760 | 8760 | 8760 | 9144 | 9144 | 9144 | 9528 | 9528 | 9528 | 9912 |
| 8 | 9912 | 9912 | 10296 | 10296 | 10680 | 10680 | 10680 | 11064 | 11064 | 11064 |
| 9 | 11064 | 11448 | 11448 | 11832 | 11832 | 11832 | 12216 | 12216 | 12576 | 12576 |
| 10 | 12576 | 12576 | 12960 | 12960 | 12960 | 13536 | 13536 | 13536 | 14112 | 14112 |
| 11 | 14112 | 14688 | 14688 | 14688 | 15264 | 15264 | 15840 | 15840 | 15840 | 16416 |
| 12 | 16416 | 16416 | 16416 | 16992 | 16992 | 17568 | 17568 | 17568 | 18336 | 18336 |
| 13 | 18336 | 18336 | 19080 | 19080 | 19848 | 19848 | 19848 | 20616 | 20616 | 20616 |
| 14 | 20616 | 20616 | 20616 | 21384 | 21384 | 22152 | 22152 | 22152 | 22920 | 22920 |
| 15 | 22152 | 22152 | 22152 | 22920 | 22920 | 23688 | 23688 | 23688 | 24496 | 24496 |
| 16 | 22920 | 23688 | 23688 | 24496 | 24496 | 24496 | 25456 | 25456 | 25456 | 26416 |
| 17 | 25456 | 26416 | 26416 | 26416 | 27376 | 27376 | 27376 | 28336 | 28336 | 29296 |
| 18 | 28336 | 28336 | 29296 | 29296 | 29296 | 30576 | 30576 | 30576 | 31704 | 31704 |
| 19 | 30576 | 30576 | 31704 | 31704 | 32856 | 32856 | 32856 | 34008 | 34008 | 34008 |
| 20 | 32856 | 34008 | 34008 | 34008 | 35160 | 35160 | 35160 | 36696 | 36696 | 36696 |
| 21 | 35160 | 36696 | 36696 | 36696 | 37888 | 37888 | 39232 | 39232 | 39232 | 40576 |
| 22 | 37888 | 39232 | 39232 | 40576 | 40576 | 40576 | 42368 | 42368 | 42368 | 43816 |
| 23 | 40576 | 40576 | 42368 | 42368 | 43816 | 43816 | 43816 | 45352 | 45352 | 45352 |
| 24 | 43816 | 43816 | 45352 | 45352 | 45352 | 46888 | 46888 | 46888 | 48936 | 48936 |
| 25 | 45352 | 45352 | 46888 | 46888 | 48936 | 48936 | 48936 | 51024 | 51024 | 51024 |
| 26 | 52752 | 52752 | 55056 | 55056 | 55056 | 55056 | 57336 | 57336 | 57336 | 59256 |
| 26A | 45352 | 46888 | 46888 | 48936 | 48936 | 48936 | 51024 | 51024 | 51024 | 52752 |

FIG. 8D

| $I_{TBS}$ | \multicolumn{10}{c|}{$N_{PRB}$} |
|---|---|---|---|---|---|---|---|---|---|---|
| | 81 | 82 | 83 | 84 | 85 | 86 | 87 | 88 | 89 | 90 |
| 0 | 2280 | 2280 | 2280 | 2344 | 2344 | 2408 | 2408 | 2472 | 2472 | 2536 |
| 1 | 2984 | 2984 | 2984 | 3112 | 3112 | 3112 | 3240 | 3240 | 3240 | 3240 |
| 2 | 3624 | 3624 | 3752 | 3752 | 3880 | 3880 | 3880 | 4008 | 4008 | 4008 |
| 3 | 4776 | 4776 | 4776 | 4968 | 4968 | 4968 | 5160 | 5160 | 5160 | 5352 |
| 4 | 5736 | 5992 | 5992 | 5992 | 5992 | 6200 | 6200 | 6200 | 6456 | 6456 |
| 5 | 7224 | 7224 | 7224 | 7480 | 7480 | 7480 | 7736 | 7736 | 7736 | 7992 |
| 6 | 8504 | 8504 | 8760 | 8760 | 8760 | 9144 | 9144 | 9144 | 9144 | 9528 |
| 7 | 9912 | 9912 | 10296 | 10296 | 10296 | 10680 | 10680 | 10680 | 11064 | 11064 |
| 8 | 11448 | 11448 | 11448 | 11832 | 11832 | 12216 | 12216 | 12216 | 12576 | 12576 |
| 9 | 12960 | 12960 | 12960 | 13536 | 13536 | 13536 | 13536 | 14112 | 14112 | 14112 |
| 10 | 14112 | 14688 | 14688 | 14688 | 14688 | 15264 | 15264 | 15264 | 15840 | 15840 |
| 11 | 16416 | 16416 | 16992 | 16992 | 16992 | 17568 | 17568 | 17568 | 18336 | 18336 |
| 12 | 18336 | 19080 | 19080 | 19080 | 19080 | 19848 | 19848 | 19848 | 20616 | 20616 |
| 13 | 20616 | 21384 | 21384 | 21384 | 22152 | 22152 | 22152 | 22920 | 22920 | 22920 |
| 14 | 22920 | 23688 | 23688 | 24496 | 24496 | 24496 | 25456 | 25456 | 25456 | 25456 |
| 15 | 24496 | 25456 | 25456 | 25456 | 26416 | 26416 | 26416 | 27376 | 27376 | 27376 |
| 16 | 26416 | 26416 | 27376 | 27376 | 27376 | 28336 | 28336 | 29296 | 29296 | 29296 |
| 17 | 29296 | 29296 | 30576 | 30576 | 30576 | 30576 | 31704 | 31704 | 31704 | 32856 |
| 18 | 31704 | 32856 | 32856 | 32856 | 34008 | 34008 | 34008 | 35160 | 35160 | 35160 |
| 19 | 35160 | 35160 | 35160 | 36696 | 36696 | 36696 | 37888 | 37888 | 37888 | 39232 |
| 20 | 37888 | 37888 | 39232 | 39232 | 39232 | 40576 | 40576 | 40576 | 42368 | 42368 |
| 21 | 40576 | 40576 | 42368 | 42368 | 42368 | 43816 | 43816 | 43816 | 45352 | 45352 |
| 22 | 43816 | 43816 | 45352 | 45352 | 45352 | 46888 | 46888 | 46888 | 48936 | 48936 |
| 23 | 46888 | 46888 | 46888 | 48936 | 48936 | 48936 | 51024 | 51024 | 51024 | 51024 |
| 24 | 48936 | 51024 | 51024 | 51024 | 52752 | 52752 | 52752 | 52752 | 55056 | 55056 |
| 25 | 51024 | 52752 | 52752 | 52752 | 55056 | 55056 | 55056 | 55056 | 57336 | 57336 |
| 26 | 59256 | 59256 | 61664 | 61664 | 61664 | 63776 | 63776 | 63776 | 66592 | 66592 |
| 26A | 52752 | 52752 | 55056 | 55056 | 55056 | 55056 | 57336 | 57336 | 57336 | 59256 |

| $I_{TBS}$ | \multicolumn{10}{c|}{$N_{PRB}$} |
|---|---|---|---|---|---|---|---|---|---|---|
| | 91 | 92 | 93 | 94 | 95 | 96 | 97 | 98 | 99 | 100 |
| 0 | 2536 | 2536 | 2600 | 2600 | 2664 | 2664 | 2728 | 2728 | 2728 | 2792 |
| 1 | 3368 | 3368 | 3368 | 3496 | 3496 | 3496 | 3496 | 3624 | 3624 | 3624 |
| 2 | 4136 | 4136 | 4136 | 4264 | 4264 | 4264 | 4392 | 4392 | 4392 | 4584 |
| 3 | 5352 | 5352 | 5352 | 5544 | 5544 | 5544 | 5736 | 5736 | 5736 | 5736 |
| 4 | 6456 | 6456 | 6712 | 6712 | 6712 | 6968 | 6968 | 6968 | 6968 | 7224 |
| 5 | 7992 | 7992 | 8248 | 8248 | 8248 | 8504 | 8504 | 8760 | 8760 | 8760 |
| 6 | 9528 | 9528 | 9528 | 9912 | 9912 | 9912 | 10296 | 10296 | 10296 | 10296 |
| 7 | 11064 | 11448 | 11448 | 11448 | 11448 | 11832 | 11832 | 11832 | 12216 | 12216 |
| 8 | 12576 | 12960 | 12960 | 12960 | 13536 | 13536 | 13536 | 13536 | 14112 | 14112 |
| 9 | 14112 | 14688 | 14688 | 14688 | 15264 | 15264 | 15264 | 15264 | 15840 | 15840 |
| 10 | 15840 | 16416 | 16416 | 16416 | 16992 | 16992 | 16992 | 16992 | 17568 | 17568 |
| 11 | 18336 | 18336 | 19080 | 19080 | 19080 | 19080 | 19848 | 19848 | 19848 | 19848 |
| 12 | 20616 | 21384 | 21384 | 21384 | 21384 | 22152 | 22152 | 22152 | 22920 | 22920 |
| 13 | 23688 | 23688 | 23688 | 24496 | 24496 | 24496 | 25456 | 25456 | 25456 | 25456 |
| 14 | 26416 | 26416 | 26416 | 27376 | 27376 | 27376 | 28336 | 28336 | 28336 | 28336 |
| 15 | 28336 | 28336 | 28336 | 29296 | 29296 | 29296 | 29296 | 30576 | 30576 | 30576 |
| 16 | 29296 | 30576 | 30576 | 30576 | 30576 | 31704 | 31704 | 31704 | 31704 | 32856 |
| 17 | 32856 | 32856 | 34008 | 34008 | 34008 | 35160 | 35160 | 35160 | 35160 | 36696 |
| 18 | 36696 | 36696 | 36696 | 37888 | 37888 | 37888 | 37888 | 39232 | 39232 | 39232 |
| 19 | 39232 | 39232 | 40576 | 40576 | 40576 | 40576 | 42368 | 42368 | 42368 | 43816 |
| 20 | 42368 | 42368 | 43816 | 43816 | 43816 | 45352 | 45352 | 45352 | 46888 | 46888 |
| 21 | 45352 | 46888 | 46888 | 46888 | 46888 | 48936 | 48936 | 48936 | 48936 | 51024 |
| 22 | 48936 | 48936 | 51024 | 51024 | 51024 | 51024 | 52752 | 52752 | 52752 | 55056 |
| 23 | 52752 | 52752 | 52752 | 55056 | 55056 | 55056 | 55056 | 57336 | 57336 | 57336 |
| 24 | 55056 | 57336 | 57336 | 57336 | 57336 | 59256 | 59256 | 59256 | 61664 | 61664 |
| 25 | 57336 | 59256 | 59256 | 59256 | 61664 | 61664 | 61664 | 61664 | 63776 | 63776 |
| 26 | 66592 | 68808 | 68808 | 68808 | 71112 | 71112 | 71112 | 73712 | 73712 | 75376 |
| 26A | 59256 | 59256 | 59256 | 61664 | 61664 | 61664 | 63776 | 63776 | 63776 | 66592 |

FIG. 8E

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 0 | 2792 | 2856 | 2856 | 2856 | 2984 | 2984 | 2984 | 2984 | 2984 | 3112 |
| 1 | 3752 | 3752 | 3752 | 3752 | 3880 | 3880 | 3880 | 4008 | 4008 | 4008 |
| 2 | 4584 | 4584 | 4584 | 4584 | 4776 | 4776 | 4776 | 4776 | 4968 | 4968 |
| 3 | 5992 | 5992 | 5992 | 5992 | 6200 | 6200 | 6200 | 6200 | 6456 | 6456 |
| 4 | 7224 | 7224 | 7480 | 7480 | 7480 | 7480 | 7736 | 7736 | 7736 | 7992 |
| 5 | 8760 | 9144 | 9144 | 9144 | 9144 | 9528 | 9528 | 9528 | 9528 | 9528 |
| 6 | 10680 | 10680 | 10680 | 10680 | 11064 | 11064 | 11064 | 11448 | 11448 | 11448 |
| 7 | 12216 | 12576 | 12576 | 12576 | 12960 | 12960 | 12960 | 12960 | 13536 | 13536 |
| 8 | 14112 | 14112 | 14688 | 14688 | 14688 | 14688 | 15264 | 15264 | 15264 | 15264 |
| 9 | 15840 | 16416 | 16416 | 16416 | 16416 | 16992 | 16992 | 16992 | 16992 | 17568 |
| 10 | 17568 | 18336 | 18336 | 18336 | 18336 | 18336 | 19080 | 19080 | 19080 | 19080 |
| 11 | 20616 | 20616 | 20616 | 21384 | 21384 | 21384 | 21384 | 22152 | 22152 | 22152 |
| 12 | 22920 | 23688 | 23688 | 23688 | 23688 | 24496 | 24496 | 24496 | 24496 | 25456 |
| 13 | 26416 | 26416 | 26416 | 26416 | 27376 | 27376 | 27376 | 27376 | 28336 | 28336 |
| 14 | 29296 | 29296 | 29296 | 29296 | 30576 | 30576 | 30576 | 30576 | 31704 | 31704 |
| 15 | 30576 | 31704 | 31704 | 31704 | 31704 | 32856 | 32856 | 32856 | 34008 | 34008 |
| 16 | 32856 | 32856 | 34008 | 34008 | 34008 | 34008 | 35160 | 35160 | 35160 | 35160 |
| 17 | 36696 | 36696 | 36696 | 37888 | 37888 | 37888 | 39232 | 39232 | 39232 | 39232 |
| 18 | 40576 | 40576 | 40576 | 40576 | 42368 | 42368 | 42368 | 42368 | 43816 | 43816 |
| 19 | 43816 | 43816 | 43816 | 45352 | 45352 | 45352 | 46888 | 46888 | 46888 | 46888 |
| 20 | 46888 | 46888 | 48936 | 48936 | 48936 | 48936 | 48936 | 51024 | 51024 | 51024 |
| 21 | 51024 | 51024 | 51024 | 52752 | 52752 | 52752 | 52752 | 55056 | 55056 | 55056 |
| 22 | 55056 | 55056 | 55056 | 57336 | 57336 | 57336 | 57336 | 59256 | 59256 | 59256 |
| 23 | 57336 | 59256 | 59256 | 59256 | 59256 | 61664 | 61664 | 61664 | 61664 | 63776 |
| 24 | 61664 | 61664 | 63776 | 63776 | 63776 | 63776 | 66592 | 66592 | 66592 | 66592 |
| 25 | 63776 | 63776 | 66592 | 66592 | 66592 | 66592 | 68808 | 68808 | 68808 | 71112 |
| 26 | 75376 | 75376 | 75376 | 75376 | 75376 | 75376 | 75376 | 75376 | 75376 | 75376 |
| 26A | 66592 | 66592 | 66592 | 68808 | 68808 | 68808 | 71112 | 71112 | 71112 | 71112 |

| $I_{TBS}$ | $N_{PRB}$ | | | | | | | | | |
|---|---|---|---|---|---|---|---|---|---|---|
| | 1 | 2 | 3 | 4 | 5 | 6 | 7 | 8 | 9 | 10 |
| 27 | 648 | 1320 | 1992 | 2664 | 3368 | 4008 | 4584 | 5352 | 5992 | 6712 |
| 28 | 680 | 1384 | 2088 | 2792 | 3496 | 4264 | 4968 | 5544 | 6200 | 6968 |
| 29 | 712 | 1480 | 2216 | 2984 | 3752 | 4392 | 5160 | 5992 | 6712 | 7480 |
| 30 | 776 | 1544 | 2344 | 3112 | 3880 | 4776 | 5544 | 6200 | 6968 | 7736 |
| 31 | 808 | 1608 | 2472 | 3240 | 4136 | 4968 | 5736 | 6456 | 7480 | 8248 |
| 32 | 840 | 1672 | 2536 | 3368 | 4264 | 5160 | 5992 | 6712 | 7736 | 8504 |
| 33 | 968 | 1992 | 2984 | 4008 | 4968 | 5992 | 6968 | 7992 | 8760 | 9912 |
| 33A | 840 | 1736 | 2600 | 3496 | 4392 | 5160 | 5992 | 6968 | 7736 | 8760 |

| $I_{TBS}$ | $N_{PRB}$ | | | | | | | | | |
|---|---|---|---|---|---|---|---|---|---|---|
| | 11 | 12 | 13 | 14 | 15 | 16 | 17 | 18 | 19 | 20 |
| 27 | 7224 | 7992 | 8504 | 9144 | 9912 | 10680 | 11448 | 11832 | 12576 | 12960 |
| 28 | 7736 | 8504 | 9144 | 9912 | 10680 | 11064 | 11832 | 12576 | 13536 | 14112 |
| 29 | 8248 | 8760 | 9528 | 10296 | 11064 | 11832 | 12576 | 13536 | 14112 | 14688 |
| 30 | 8504 | 9528 | 10296 | 11064 | 11832 | 12576 | 13536 | 14112 | 14688 | 15840 |
| 31 | 9144 | 9912 | 10680 | 11448 | 12216 | 12960 | 14112 | 14688 | 15840 | 16416 |
| 32 | 9528 | 10296 | 11064 | 11832 | 12960 | 13536 | 14688 | 15264 | 16416 | 16992 |
| 33 | 10680 | 11832 | 12960 | 13536 | 14688 | 15840 | 16992 | 17568 | 19080 | 19848 |
| 33A | 9528 | 10296 | 11448 | 12216 | 12960 | 14112 | 14688 | 15840 | 16416 | 17568 |

| $I_{TBS}$ | $N_{PRB}$ | | | | | | | | | |
|---|---|---|---|---|---|---|---|---|---|---|
| | 21 | 22 | 23 | 24 | 25 | 26 | 27 | 28 | 29 | 30 |
| 27 | 14112 | 14688 | 15264 | 15840 | 16416 | 16992 | 17568 | 18336 | 19080 | 19648 |
| 28 | 14688 | 15264 | 16416 | 16992 | 17568 | 18336 | 19080 | 19848 | 20616 | 21384 |
| 29 | 15840 | 16416 | 16992 | 17568 | 18336 | 19080 | 19848 | 20616 | 21384 | 22152 |
| 30 | 16416 | 16992 | 18336 | 19080 | 19848 | 20616 | 21384 | 22152 | 22920 | 23688 |
| 31 | 17568 | 18336 | 19080 | 19848 | 20616 | 21384 | 22152 | 22920 | 23688 | 24496 |
| 32 | 17568 | 19080 | 19848 | 20616 | 21384 | 22152 | 22920 | 23688 | 24496 | 25456 |
| 33 | 20616 | 21384 | 22920 | 23688 | 24496 | 25456 | 26416 | 27376 | 28336 | 29296 |

FIG. 8F

| | | | | | | | | | | |
|---|---|---|---|---|---|---|---|---|---|---|
| 33A | 18336 | 19080 | 19848 | 20616 | 22152 | 22920 | 23688 | 24496 | 25456 | 26416 |

| $I_{TBS}$ | $N_{PRB}$ | | | | | | | | | |
|---|---|---|---|---|---|---|---|---|---|---|
| | 31 | 32 | 33 | 34 | 35 | 36 | 37 | 38 | 39 | 40 |
| 27 | 20616 | 21384 | 22152 | 22920 | 22920 | 23688 | 24496 | 25456 | 25456 | 26416 |
| 28 | 22152 | 22152 | 22920 | 23688 | 24496 | 25456 | 26416 | 26416 | 27376 | 28336 |
| 29 | 22920 | 23688 | 24496 | 25456 | 26416 | 26416 | 27376 | 28336 | 29296 | 29296 |
| 30 | 24496 | 25456 | 25456 | 26416 | 27376 | 28336 | 29296 | 29296 | 30576 | 31704 |
| 31 | 25456 | 26416 | 27376 | 28336 | 29296 | 29296 | 30576 | 31704 | 31704 | 32856 |
| 32 | 26416 | 27376 | 28336 | 29296 | 29296 | 30576 | 31704 | 32856 | 32856 | 34008 |
| 33 | 30576 | 31704 | 32856 | 34008 | 35160 | 35160 | 36696 | 37888 | 39232 | 39232 |
| 33A | 27376 | 27376 | 29296 | 29296 | 30576 | 30576 | 31704 | 32856 | 34008 | 35160 |

| $I_{TBS}$ | $N_{PRB}$ | | | | | | | | | |
|---|---|---|---|---|---|---|---|---|---|---|
| | 41 | 42 | 43 | 44 | 45 | 46 | 47 | 48 | 49 | 50 |
| 27 | 27376 | 27376 | 28336 | 29296 | 29296 | 30576 | 31704 | 31704 | 32856 | 32856 |
| 28 | 29296 | 29296 | 30576 | 30576 | 31704 | 32856 | 32856 | 34008 | 34008 | 35160 |
| 29 | 30576 | 31704 | 31704 | 32856 | 34008 | 34008 | 35160 | 35160 | 36696 | 36696 |
| 30 | 31704 | 32856 | 34008 | 34008 | 35160 | 36696 | 36696 | 37888 | 37888 | 39232 |
| 31 | 34008 | 35160 | 35160 | 36696 | 36696 | 37888 | 39232 | 39232 | 40576 | 40576 |
| 32 | 35160 | 35160 | 36696 | 37888 | 37888 | 39232 | 40576 | 40576 | 42368 | 42368 |
| 33 | 40576 | 40576 | 42368 | 43816 | 43816 | 45352 | 46888 | 46888 | 48936 | 48936 |
| 33A | 35160 | 36696 | 36696 | 37888 | 39232 | 40576 | 40576 | 40576 | 42368 | 43816 |

| $I_{TBS}$ | $N_{PRB}$ | | | | | | | | | |
|---|---|---|---|---|---|---|---|---|---|---|
| | 51 | 52 | 53 | 54 | 55 | 56 | 57 | 58 | 59 | 60 |
| 27 | 34008 | 34008 | 35160 | 35160 | 36696 | 36696 | 37888 | 37888 | 39232 | 39232 |
| 28 | 35160 | 36696 | 36696 | 37888 | 39232 | 39232 | 40576 | 40576 | 42368 | 42368 |
| 29 | 37888 | 39232 | 39232 | 40576 | 40576 | 42368 | 42368 | 43816 | 43816 | 45352 |
| 30 | 40576 | 40576 | 42368 | 42368 | 43816 | 43816 | 45352 | 45352 | 46888 | 46888 |
| 31 | 42368 | 42368 | 43816 | 45352 | 45352 | 46888 | 46888 | 46888 | 48936 | 48936 |
| 32 | 43816 | 43816 | 45352 | 46888 | 46888 | 46888 | 48936 | 48936 | 51024 | 51024 |
| 33 | 51024 | 51024 | 52752 | 52752 | 55056 | 55056 | 57336 | 57336 | 59256 | 59256 |
| 33A | 43816 | 45352 | 45352 | 46888 | 48936 | 48936 | 48936 | 51024 | 51024 | 52752 |

| $I_{TBS}$ | $N_{PRB}$ | | | | | | | | | |
|---|---|---|---|---|---|---|---|---|---|---|
| | 61 | 62 | 63 | 64 | 65 | 66 | 67 | 68 | 69 | 70 |
| 27 | 40576 | 40576 | 42368 | 42368 | 43816 | 43816 | 43816 | 45352 | 45352 | 46888 |
| 28 | 42368 | 43816 | 43816 | 45352 | 45352 | 46888 | 46888 | 46888 | 48936 | 48936 |
| 29 | 45352 | 45352 | 46888 | 46888 | 48936 | 48936 | 48936 | 51024 | 51024 | 52752 |
| 30 | 46888 | 48936 | 48936 | 51024 | 51024 | 51024 | 52752 | 52752 | 55056 | 55056 |
| 31 | 51024 | 51024 | 52752 | 52752 | 52752 | 55056 | 55056 | 55056 | 57336 | 57336 |
| 32 | 52752 | 52752 | 52752 | 55056 | 55056 | 57336 | 57336 | 57336 | 59256 | 59256 |
| 33 | 59256 | 61664 | 61664 | 63776 | 63776 | 63776 | 66592 | 66592 | 68808 | 68808 |
| 33A | 52752 | 55056 | 55056 | 55056 | 57336 | 57336 | 57336 | 59256 | 59256 | 61664 |

| $I_{TBS}$ | $N_{PRB}$ | | | | | | | | | |
|---|---|---|---|---|---|---|---|---|---|---|
| | 71 | 72 | 73 | 74 | 75 | 76 | 77 | 78 | 79 | 80 |
| 27 | 46888 | 46888 | 48936 | 48936 | 48936 | 51024 | 51024 | 51024 | 52752 | 52752 |
| 28 | 48936 | 51024 | 51024 | 52752 | 52752 | 52752 | 55056 | 55056 | 55056 | 57336 |
| 29 | 52752 | 52752 | 55056 | 55056 | 55056 | 57336 | 57336 | 57336 | 59256 | 59256 |
| 30 | 55056 | 57336 | 57336 | 57336 | 59256 | 59256 | 59256 | 61664 | 61664 | 63776 |
| 31 | 59256 | 59256 | 59256 | 61664 | 61664 | 63776 | 63776 | 63776 | 66592 | 66592 |
| 32 | 61664 | 61664 | 61664 | 63776 | 66592 | 66592 | 66592 | 66592 | 66592 | 68808 |
| 33 | 71112 | 71112 | 71112 | 73712 | 75376 | 76208 | 76208 | 76208 | 78704 | 78704 |
| 33A | 61664 | 61664 | 63776 | 63776 | 66592 | 66592 | 66592 | 68808 | 68808 | 68808 |

| $I_{TBS}$ | $N_{PRB}$ | | | | | | | | | |
|---|---|---|---|---|---|---|---|---|---|---|
| | 81 | 82 | 83 | 84 | 85 | 86 | 87 | 88 | 89 | 90 |
| 27 | 52752 | 55056 | 55056 | 55056 | 57336 | 57336 | 57336 | 59256 | 59256 | 59256 |
| 28 | 57336 | 57336 | 59256 | 59256 | 59256 | 61664 | 61664 | 61664 | 61664 | 63776 |

FIG. 8G

| $I_{TBS}$ | | | | | | | | | | |
|---|---|---|---|---|---|---|---|---|---|---|
| 29 | 59256 | 61664 | 61664 | 61664 | 63776 | 63776 | 63776 | 66592 | 66592 | 66592 |
| 30 | 63776 | 63776 | 63776 | 66592 | 66592 | 66592 | 68808 | 68808 | 68808 | 71112 |
| 31 | 66592 | 68808 | 68808 | 68808 | 71112 | 71112 | 71112 | 73712 | 73712 | 73712 |
| 32 | 68808 | 71112 | 71112 | 71112 | 73712 | 73712 | 73712 | 75376 | 76208 | 76208 |
| 33 | 81176 | 81176 | 81176 | 81176 | 84760 | 84760 | 84760 | 87936 | 87936 | 87936 |
| 33A | 71112 | 71112 | 71112 | 73712 | 75376 | 75376 | 76208 | 76208 | 78704 | 78704 |

| $I_{TBS}$ | $N_{PRB}$ | | | | | | | | | |
|---|---|---|---|---|---|---|---|---|---|---|
| | 91 | 92 | 93 | 94 | 95 | 96 | 97 | 98 | 99 | 100 |
| 27 | 59256 | 61664 | 61664 | 61664 | 63776 | 63776 | 63776 | 63776 | 66592 | 66592 |
| 28 | 63776 | 63776 | 66592 | 66592 | 66592 | 66592 | 68808 | 68808 | 68808 | 71112 |
| 29 | 66592 | 68808 | 68808 | 68808 | 71112 | 71112 | 71112 | 73712 | 73712 | 73712 |
| 30 | 71112 | 71112 | 73712 | 73712 | 75376 | 75376 | 76208 | 76208 | 78704 | 78704 |
| 31 | 75376 | 76208 | 76208 | 78704 | 78704 | 78704 | 81176 | 81176 | 81176 | 81176 |
| 32 | 78704 | 78704 | 78704 | 81176 | 81176 | 81176 | 84760 | 84760 | 84760 | 84760 |
| 33 | 90816 | 90816 | 90816 | 93800 | 93800 | 93800 | 93800 | 97896 | 97896 | 97896 |
| 33A | 78704 | 81176 | 81176 | 81176 | 81176 | 84760 | 84760 | 84760 | 84760 | 87936 |

| $I_{TBS}$ | $N_{PRB}$ | | | | | | | | | |
|---|---|---|---|---|---|---|---|---|---|---|
| | 101 | 102 | 103 | 104 | 105 | 106 | 107 | 108 | 109 | 110 |
| 27 | 66592 | 66592 | 68808 | 68808 | 68808 | 71112 | 71112 | 71112 | 71112 | 73712 |
| 28 | 71112 | 71112 | 73712 | 73712 | 73712 | 75376 | 75376 | 76208 | 76208 | 76208 |
| 29 | 75376 | 76208 | 76208 | 76208 | 78704 | 78704 | 78704 | 81176 | 81176 | 81176 |
| 30 | 78704 | 81176 | 81176 | 81176 | 84760 | 84760 | 84760 | 84760 | 84760 | 87936 |
| 31 | 84760 | 84760 | 84760 | 84760 | 87936 | 87936 | 87936 | 87936 | 90816 | 90816 |
| 32 | 87936 | 87936 | 87936 | 87936 | 90816 | 90816 | 90816 | 93800 | 93800 | 93800 |
| 33 | 97896 | 97896 | 97896 | 97896 | 97896 | 97896 | 97896 | 97896 | 97896 | 97896 |
| 33A | 87936 | 87936 | 87936 | 90816 | 90816 | 90816 | 93800 | 93800 | 93800 | 97896 |

FIG. 8H ic # TRANSPORT BLOCK SIZE DETERMINATION FOR SHORT TRANSMISSION TIME INTERVAL

TECHNICAL FIELD

The present disclosure relates generally to the field of communications, and in particular, to transport block size determination for a short transmission time interval transmission.

BACKGROUND

Transmission Time Interval (TTI) specifies a periodicity in which the physical layer of a transmitter transfers one or more transport blocks on the wireless interface. Generally, the longer the TTI, the larger the transport block size that may be supported. The duration of the TTI may impact communication performance in various ways. For example, systems that use a relatively short TTI may enable receivers to more quickly receive a full transport block from which to estimate bit error rate and/or block error rate and apply corresponding link adaptation techniques. Thus, a shorter TTI may reduce packet data latency and allow a receiver and transmitter to more quickly adapt to conditions on the link between them. On the other hand, systems that use a relatively long TTI may use more efficient error correction and compression techniques. For example, such systems may use fewer cyclic redundancy check (CRC) codes per bits transmitted and/or may include more compressible duplication per transport block.

In several releases of Long Term Evolution (LTE) (e.g., releases 8 and 10), the TTI is typically set to one subframe (SF), which is 1 millisecond long. This 1 ms TTI is typically constructed using either fourteen or twelve symbols, depending on whether a normal or extended cyclic prefix is used, respectively. These symbols may be Orthogonal Frequency-Division Multiplexing (OFDM) or Single-Carrier Frequency-Division Multiple Access (SC-FDMA), for example, and may be used for transmission of one or more transport blocks. In particular, LTE release 10 typically permits up to two dynamically-sized transport blocks to be delivered from the Media Access Control (MAC) layer to the physical layer and transmitted over the radio interface per TTI. Each transmission may be performed using a number of Physical Resource Blocks (PRB), each of which has 12 sub-carriers. A single symbol of one sub-carrier is a Resource Element (RE). Many of the transmission parameters used in particular releases of LTE, for example, are specifically for use in transmitting transport blocks within a 1 ms TTI. Other communication schemes similarly require the use of a static TTI.

SUMMARY

One or more of embodiments of the present disclosure determine a short TTI transport block size, used for transport block transmission within a short TTI (e.g., a TTI shorter than 1 ms), by downscaling a long TTI transmission block size used for transport block transmission within a long TTI (e.g., a TTI of 1 ms or longer). This downscaling may be based on a relation between the number of symbols in the short TTI and the number of symbols in the long TTI. For example, the downscaling may be based on a ratio of the short and long symbol quantities.

Accordingly, embodiments herein include a method performed by a communication device. The method comprises identifying a long transmission time interval (TTI) transport block size from a set (or table) of long TTI transport block sizes used for transport block transmission within a long TTI. The method further comprises determining a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In some embodiments, downscaling the long TTI transport block size based on the relation between the number of symbols in the short TTI and the number of symbols in the long TTI comprises downscaling the long TTI transport block size based on a ratio of the number of symbols in the short TTI and the number of symbols in the long TTI. In an embodiment, downscaling the long TTI transport block size based on the ratio of the number of symbols in the short TTI and the number of symbols in the long TTI comprises applying a compensation factor of less than 1 to the ratio.

In any of the above embodiments, the downscaling based on the number of symbols in the short TTI is based on the number of symbols used for data transmission in the short TTI and wherein the downscaling based on the number of symbols in the long TTI is based on the number of symbols used for data transmission in the long TTI.

In any of the above embodiments, the set or table maps sets of transmit parameters to the long TTI transport block sizes used for transport block transmission within the long TTI.

In any of the above embodiments, the long TTI transport block size is identified from the set or table based on a set of transmit parameters to be used for an upcoming transport block transmission within the short TTI. In some such embodiments, the set of transmit parameters comprises a number of assigned physical resource blocks. In an embodiment, the set of transmit parameters further comprises a modulation and coding index, and a modulation order. Further, identifying the long TTI transport block size comprises determining a transport block size index based on the modulation and coding index and the modulation order, and using the number of assigned physical resource blocks and the transport block size index as indices into the set or table to obtain the long TTI transport block size.

In any of the above embodiments, the downscaling of the long TTI transport block size is further based on a number of bits used for a CRC.

In any of the above embodiments, the downscaling is further based on a number of resource elements allocated to control channel transmission within the short TTI. In an embodiment, the downscaling is based on a factor of:

$$\frac{N_{data}^{SSF}}{N_{data}^{SF}}\left(1 - \frac{C}{N_{data}^{SSF} 12 M}\right).$$

According to this factor, $N_{data}^{SSF}$ is the number of symbols in the short TTI. $N_{data}^{SF}$ is the number of symbols in the Long TTI. C is the number of REs allocated to the control channel transmission within the short TTI. M is a number of subbands allocated to data transmission within the short TTI.

In any of the above embodiments, determining the short TTI transport block size by downscaling the long TTI transport block size comprises selecting, as the short TTI transport block size, a further transport block size from the set or table that is closest to the downscaled long TTI transport block size.

In any of the above embodiments, the short TTI transport block size is selected from a set or table comprising the long TTI transport block sizes and an additional transport block size, and optionally, the additional transport block size is eight bits.

In any of the above embodiments, at least one of the transport block sizes in the set or table is eight bits.

In any of the above embodiments, the method further comprises determining a further short TTI transport block size for each further long TTI transport block size in the set or table by downscaling the further long TTI transport block size based on the relation between the number of symbols in the short TTI and the number of symbols in the long TTI.

In any of the above embodiments, the method further comprises configuring transmission circuitry to transmit within the short TTI according to the determined short TTI transport block size.

In any of the above embodiments, the downscaling based on the number of symbols in the short TTI is based on the number of symbols used for data transmission in the short TTI and wherein the downscaling based on the number of symbols in the long TTI is based on the number of symbols used for data transmission in the long TTI.

In any of the above embodiments, the long TTI transport block size is identified using a set of transmit parameters for transport block transmission.

In any of the above embodiments, the short TTI transport block size is selected from a set comprising the long TTI transport block sizes and an additional transport block size, and optionally, the additional transport block size is eight bits.

In any of the above embodiments, the identifying the long transmission time interval (TTI) transport block size from a set of long TTI transport block sizes comprises identifying the long transmission time interval (TTI) transport block size from a set or table of long TTI transport block sizes used for transport block transmission within a long TTI.

An aspect of the disclosure provides a communication device comprising a processor and a memory. The memory containing instructions executable by the processor whereby the communication device is operative to identify a long transmission time interval (TTI) transport block size from a set (or table) of long TTI transport block sizes used for transport block transmission within a long TTI; and determine a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In any of the above embodiments, downscaling the long TTI transport block size based on the relation between the number of symbols in the short TTI and the number of symbols in the long TTI comprises downscaling the long TTI transport block size based on a ratio of the number of symbols in the short TTI and the number of symbols in the long TTI.

In any of the above embodiments, the long TTI transport block size is identified from the set of long TTI transport block sizes based on a set of transmit parameters to be used for an upcoming transport block transmission within the short TTI.

In any of the above embodiments, the downscaling is further based on a number of resource elements allocated to control channel transmission within the short TTI.

Aspects of the disclosure provide a communication device configured to perform the method of any example or embodiment.

Aspects of the disclosure provide a communication device comprising an identifying module configured to identify a long transmission time interval (TTI) transport block size from a set (or table) of long TTI transport block sizes used for transport block transmission within a long TTI; and a determining module configured to determine a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In some examples, the determining module is configured to downscale the long TTI transport block size based on a ratio of the number of symbols in the short TTI and the number of symbols in the long TTI.

In some examples, the identifying module is configured to identify the long TTI transport block size from the set of long TTI transport block sizes based on a set of transmit parameters to be used for an upcoming transport block transmission within the short TTI.

In some examples, the determining module is configured to downscale the long TTI transport block size based on a number of elements allocated to control channel transmission within the short TTI.

In some examples, the communication device is configured to perform the method of any example.

Examples provide a communication device configured to identify a long transmission time interval (TTI) transport block size from a set or table of long TTI transport block sizes used for transport block transmission within a long TTI; and determine a short TTI transport block size, used for transport block transmission within a short TTI, by downscaling the long TTI transport block size based on a relation between a number of symbols in the short TTI and a number of symbols in the long TTI that is greater than the number of symbols in the short TTI.

Embodiments herein also include corresponding apparatus, computer programs, and carriers (e.g., computer program products). Example of the communication device may be a wireless terminal or network node, and examples of method may be implemented by a wireless terminal or network node.

BRIEF DESCRIPTION OF THE DRAWINGS

Aspects of the present disclosure are illustrated by way of example and are not limited by the accompanying figures with like references indicating like elements. In general, the use of a reference numeral should be regarded as referring to the depicted subject matter generally, whereas discussion of a specific instance of an illustrated element will append a letter designation thereto (e.g., discussion of a communication device 110, generally, as opposed to discussion of particular instances of communication devices 110*a*, 110*b*).

FIG. 2 illustrates an example of a set or table of TBS values, according to embodiments of the present disclosure.

FIG. 4 is a block diagram illustrating example hardware useful for implementing one or more of the methods described herein, according to embodiments of the present disclosure.

FIG. 5 is a block diagram illustrating example means, physical units, or software modules of a communication device useful for implementing one or more of the methods described herein, according to embodiments of the present disclosure.

FIGS. 8A-8H illustrate a further example of a set or table of TBS values, according to embodiments of the present disclosure.

DETAILED DESCRIPTION

As will be described in detail below, aspects of the present disclosure may be implemented entirely as hardware units, entirely as software modules (including firmware, resident software, micro-code, etc.), or as a combination of hardware units and software modules. For example, embodiments of the present disclosure may take the form of a non-transitory computer readable medium storing software instructions in the form of a computer program that, when executed on a programmable device, configures the programmable device to execute the various methods described below.

For clarity in understanding the disclosure below, to the extent that "one of" a conjunctive list of items (e.g., "one of A and B") is discussed, the present disclosure refers to one (but not both) of the items in the list (e.g., an A or a B, but not both A and B). Such a phrase does not refer to one of each of the list items (e.g., one A and one B), nor does such a phrase refer to only one of a single item in the list (e.g., only one A, or only one B). Similarly, to the extent that "at least one of" a conjunctive list of items is discussed (and similarly for "one or more of" such a list), the present disclosure refers to any item in the list or any combination of the items in the list (e.g., an A only, a B only, or both an A and a B). Such a phrase does not refer to one or more of each of the items in the list (e.g., one or more of A, and one or more of B).

Figure 1:
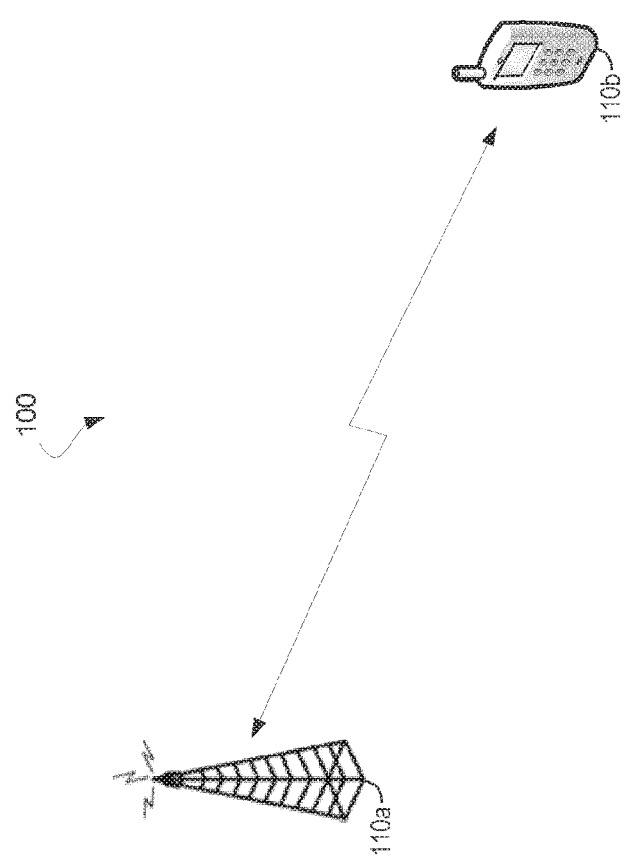
FIG. 1 is a block diagram illustrating example wireless communication between communication devices, according to embodiments of the present disclosure.

One or more embodiments of the present disclosure determine a short TTI transport block size, used for transport block transmission within a short TTI, by downscaling a long TTI transmission block size used for transport block transmission within a long TTI. Such a technique may be used, for example, to extend support for the short TTI into systems that traditionally use the long TTI for transmission. FIG. 1 illustrates example wireless communication 100 between communication devices 110a, 110b in which such a technique may be used. In this particular example 100, each communication device 110a, 110b is a radio node. More particularly, communication device 110a is a base station and communication device 110b is a mobile terminal.

As used herein, a radio node may be any type of node (e.g., a radio network node or wireless device) capable of communicating with another node over radio signals. Other types of communication devices 110 include other types of nodes (not shown), such as optical and acoustic nodes which communicate using optical and acoustic signals, respectively. Further, particular communication devices 110 include nodes of multiple types (e.g., a node that bridges radio and optical communication).

A radio network node is any type of radio node within a wireless communication network, such as the base station 110a. A network node is any type of node within a wireless communication network, whether a radio network node or not. A mobile terminal (such as the mobile terminal 110b) is any type of radio node capable of communicating with a radio network node over radio signals. A mobile terminal may therefore refer to a user equipment (UE), a wireless device, a machine-to-machine (M2M) device, a machine-type communications (MTC) device, a NarrowBand Internet-of-Things (NB-IoT) device, etc. It should be noted that a UE does not necessarily have a "user" in the sense of an individual person owning and/or operating the device. Thus, although examples of mobile terminals may be considered UEs, they may be configured to transmit and/or receive data with or without direct human interaction. Unless the context indicates otherwise, any communication device (e.g., communication device 110a) may communicate with any other communication device (e.g., communication device 110b) directly and/or via any further communication device (e.g., via a relay base station, not shown).

Aspects of the disclosure provide for transport block size determination for short TTI with code rate optimization. Aspects utilize latency reduction with short subframes. Packet data latency is one of the performance metrics that vendors, operators and also end-users (via speed test applications) regularly measures. Latency measurements are often done in all phases of a radio access network system lifetime, when verifying a new software release or system component, when deploying a system and when the system is in commercial operation. Shorter latency than previous generations of 3GPP radio access technologies was one performance metric that guided the design of LTE. LTE is also now recognized by end-users to be a system that provides faster access to internet and lower data latencies than previous generations of mobile radio technologies. Packet data latency is important not only for the perceived responsiveness of the system; it is also a parameter that indirectly influences the throughput of the system. HTTP/TCP is the dominating application and transport layer protocol suite used on the internet today. The typical size of HTTP based transactions over the internet are in the range of a few 10's of Kbyte up to 1 Mbyte. In this size range, the TCP slow start period is a significant part of the total transport period of the packet stream. During TCP slow start the performance is latency limited. Hence, improved latency can rather easily be showed to improve the average throughput, for this type of TCP based data transactions. Radio resource efficiency can be positively impacted by latency reductions. Lower packet data latency could increase the number of transmissions possible within a certain delay bound; hence higher Block Error Rate (BLER) targets could be used for the data transmissions freeing up radio resources potentially improving the capacity of the system.

Addressing packet latency reductions is the reduction of transport time of data and control signaling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

In some aspects, embodiments described may be considered as shortening the TTIs by introducing a sub sub-frame (SSF) concept. The shorter TTIs, SSF, can be decided to have any duration in time and comprise resources on a number of OFDM or SC-FDMA symbols within a 1 ms subframe. As one example, the duration of the SSF may be 0.5 ms, i.e. seven OFDM or SC-FDMA symbols for the case with normal cyclic prefix. As another example, the duration of the short TTI may be 2 symbols, 3 symbols, 4 symbols, etc, or a combination of different short TTI lengths.

Aspects of the disclosure relate to determining a transport block size. Data on a transport channel is transmitted in units known as Transport Blocks (TB), each of which corresponds to a MAC layer Protocol Data Unit (PDU). In LTE release 10, within each TTI, corresponding to one subframe duration of 1 ms (i.e. long TTI), up to two TBs of dynamic size are delivered from MAC layer to the physical layer and transmitted over the radio interface. The number of TBs transmitted within a TTI depends on the configuration of the multi-antenna transmission schemes.

Associated with each TB is a transport format, specifying how the TB is to be transmitted. The transport format includes information about the Transport Block Size (TBS), the Modulation- and Coding Scheme (MCS), and the antenna mapping. Each transmission is done by using a number of Physical Resource Blocks (PRB) where one PRB corresponds to 12 sub-carriers. One sub-carrier for one OFDM or SC-FDMA symbol is denoted as a Resource Element (RE). In downlink, some of the RE within one OFDM symbol can be allocated to reference symbols while other REs in the same OFDM symbol are used for user data. This is contrast to uplink where all REs of a SC-FDMA symbol is either allocated to user data or allocated to reference signals.

The transport formats for a Physical Downlink Shared Channel (PDSCH) and Physical Uplink Shared Channel (PUSCH) data transmission are signaled in the corresponding Downlink Control Information (DCI) format on the Physical Downlink Control Channel (PDCCH) or enhanced PDCCH (ePDCCH). The Downlink Control Information is transmitted by the communication device 11a. A number of DCI formats are provided for the scheduling of PUSCH and PDSCH, in which the number of RBs and the MCS for each TB are specified. The TBS is determined by the MCS together with the number of resource blocks assigned, information provided in the corresponding DCI format. The available transport block sizes may be the same, or may be different, for the downlink and uplink, according to particular embodiments.

Mobile terminals (also referred to as communication devices or wireless devices) may obtain the information of MCS and the number of assigned resource blocks from the decoded DCI or DCIs. Short PDSCH (sPDSCH) and short PUSCH (sPUSCH) may denote the downlink and uplink physical shared channels with SSFs, respectively. The communication device 110b (i.e. wireless device or UE) is configured to receive the DCI from the communication device 110a (i.e. radio base station) in order to obtain control information relating to uplink and downlink data transmissions using a short TTI, e.g. sPUSCH and/or sPDSCH. Existing transport block size tables in some LTE systems are defined for a fixed length TTI of 1 ms. As mentioned above, one way to reduce latency is to reduce the 1 ms TTI from one SF to a shorter TTI of one SSF. Thus, instead of transmitting a TB within a time duration of 1 ms, the TB is transmitted within a SSF whose length is less than 14 OFDM or SC-FDMA symbols. For a given number of assigned resource blocks, the number of available resource elements for data transmission within a SSF can be significantly less as compared to the case of the legacy 1 ms TTI (i.e. long TTI). Thus, the existing TBS tables intended for long TTI cannot be used for supporting SSFs (i.e. short TTI).

Figure 2:
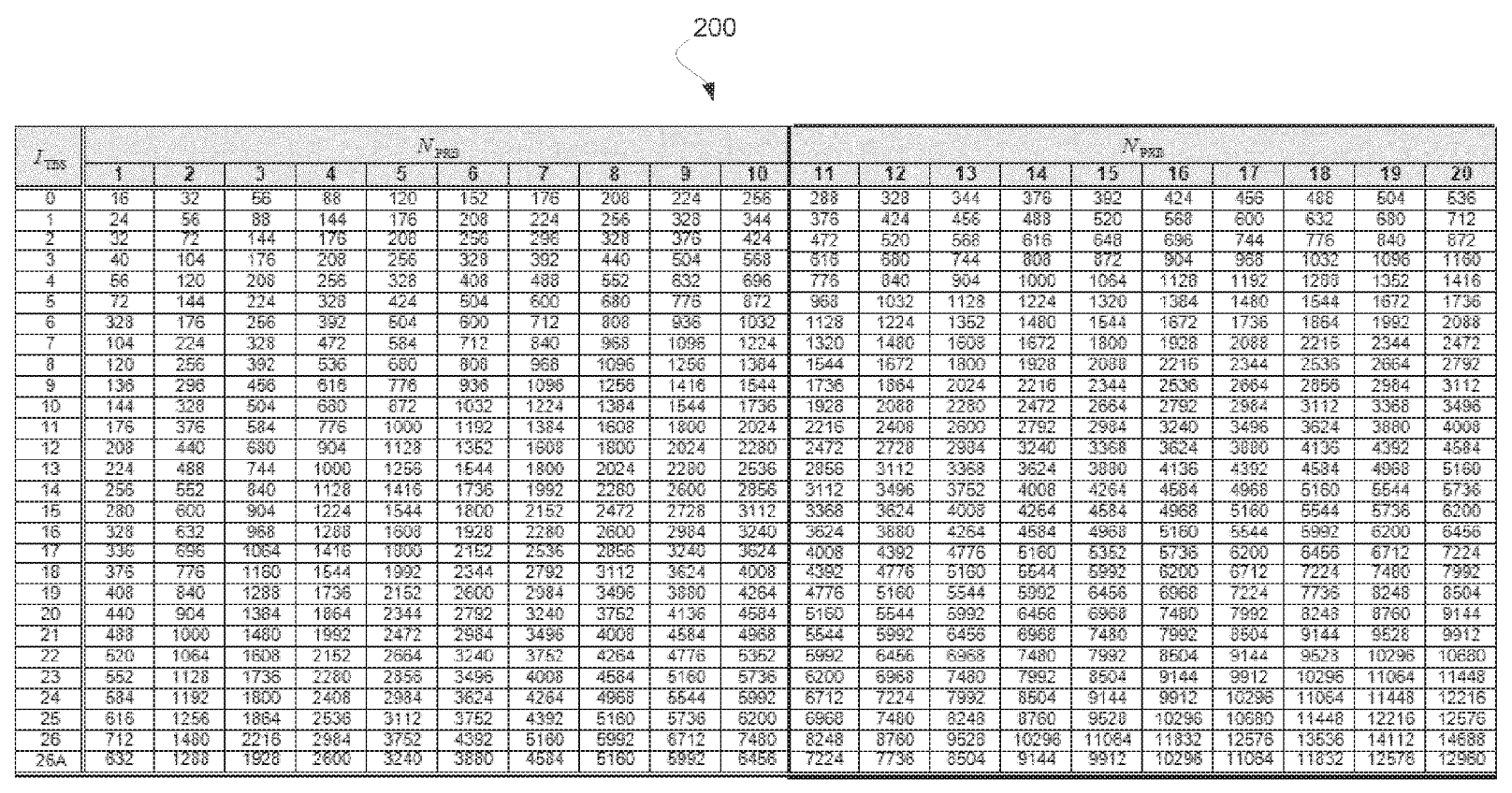

Some systems are unable to use a short TTI because certain transmission parameters in the system are configured to rely on a TTI that is longer. For example, some LTE systems determine Transport Block Size (TBS), as well as other transmission parameters, based on a presumption that a 1 ms TTI will be used for transmission. For example, such an LTE system may designate a transport format that specifies how each transport block is to be transmitted. This transport format may, for example, be signaled for a Physical Downlink Shared Channel (PDSCH) and/or Physical Uplink Shared Channel (PUSCH) data transmission in a corresponding Downlink Control Information (DCI) format on the Physical Downlink Control Channel (PDCCH) and/or enhanced PDCCH (ePDCCH). The DCI format may include the Modulation-and-Coding Scheme (MCS), the modulation order, and/or the number of assigned physical resource blocks (PRBs) that will be used for each transport block. The TBS for that transport block may be determined based on these transmission parameters (alternatively referred to as transmit parameters). In particular, the communication device 110b (e.g. wireless device) receives the DCI and determines a TBS for an uplink or downlink, 1 ms TTI or short TTI, transmission based on the transmission parameters and according to the disclosure. For example, the TBS may be determined using a set of TBS size values, arranged in a table of sizes based on the MCS, modulation order, and/or number of assigned RBs. An example of such a table 200 showing a set of TBS values in which TBS may be determined for a long TTI is illustrated in FIG. 2.

The table 200 maps sets of transmit parameters to respective TBS values used for transmitting within the 1 ms TTI. In particular, the table 200 maps TBS indices ($I_{TBS}$) and numbers of assigned PRBs ($N_{PRB}$) to respective TBSs in bits for use in transmitting within a 1 ms TTI. Other embodiments may use different and/or one or more additional tables, e.g., different tables for the uplink and downlink. Examples of such different and/or additional tables include a bigger table that also accounts for $N_{PRB}$ greater than 20 and a table that includes different TBS values. The table 200 may be considered as defining a set of TBS values, and references to the table of TBS values may alternatively refer to a set of TBS values.

Arbitrarily shortening the TTI may cause a TBS selected based on the above to be improper (e.g., by providing an inadequate TTI for the same TBS). Further, using a separate table for each supported TTI may complicate implementation and/or consume a significant amount of memory to store. Some embodiments of the present disclosure determine a TBS for a short TTI by downscaling a TBS that is used for a long TTI. In some embodiments, this may obviate the need for an entirely separate table for the short TTI. In some embodiments, this may allow for a TTI that is shorter than the long TTI to be selected dynamically. In some embodiments, this may allow a separate table to be generated from a table 200 of long TTI TBS values once the short TTI has been identified.

Embodiments described herein reuse the long TTI TBS tables to support short TTI operation. For a certain sPDSCH or sPUSCH, the TBS value is found by scaling with the number of data OFDM symbols, and in some examples, take CRC insertion and allowed TBS values into account.

Examples may permit reuse of existing long TTI TBS tables for any short TTI length. This may result in minimum modifications for standardization specifications, and may retain certain desired properties of previous TTI length operation that may be required for practical implementation of SSF (i.e. short TTI) TBS determination. These properties include, for example, that TBS is an integer number of bytes and/or that values align with Quadrature Permutation Polynomial (QPP) interleaver size. A benefit may be that the code rate for a certain MCS is close to the code rate achieved with legacy TTI operation, e.g., to ensure retained functionality in existing link adaptation algorithms and channel quality measurements and feedback.

Figure 3:
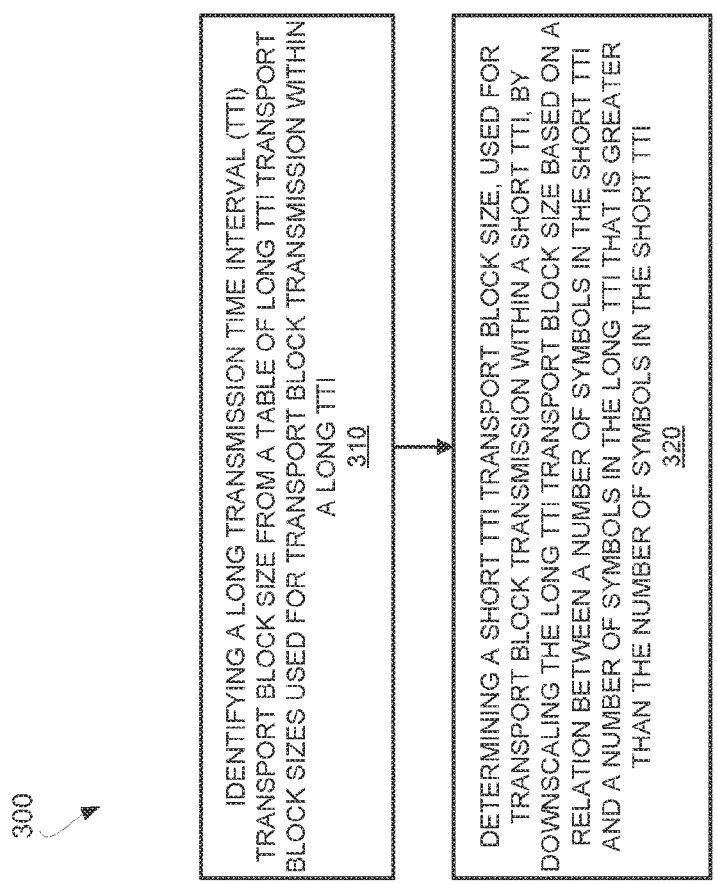
FIG. 3 is a flow diagram illustrating an example method implemented by a communication device according embodiments of the present disclosure.

FIG. 3 illustrates an example method 300 in accordance with one or more of such embodiments. The method may be performed by a communication device 110, e.g. wireless device 100b and/or network node 110a The method comprises identifying a long TTI transport block size from a set, e.g. a table 200, of long TTI transport block sizes used for transport block transmission within a long TTI (block 310). The long TTI transport block size is identified using a set of transmit parameters for transport block transmission. In some aspects, the transmit parameters are used as parameters for the short TTI transmission, e.g. as well as for identifying the long TTI transport block size.

The method 300 further comprises determining a short TTI transport block size, used for transport block transmission within a short TTI, by downscaling the long TTI transport block size based on a relation between a number of symbols in the short TTI and a number of symbols in the long TTI that is greater than the number of symbols in the short TTI (block 320).

In some aspects, the method 300 may be considered to include the transmission of control information by the network node indicating transmission parameters (e.g. MCS, modulation order and/or number of assigned RBs). In some aspects, the transmission parameters are determined independently of the TBS. In some examples, the network node determines the TBS according to any example of the method described. Thus, at least some of the transmission parameters transmitted from the network node to the wireless device are not modified when providing information for a short TTI compared to a 1 ms TTI. Examples of the method may include the transmission of data, in uplink or downlink, in a short TTI has a TBS which is determined from the transmission parameters by scaling the TBS as determined for a 1 ms TTI, according to any example.

In some aspects, the method 300 may be considered to include the receiving of control information by the wireless device 110b. In some aspects, the method includes the wireless device 110b receiving a downlink transmission, or transmitting an uplink transmission according to a TBS determined in the wireless device 110b according to any example. Thus, the communication devices 110a,110b may communicate using a short TTI and both communication devices 110a,110b determine the same TBS for the short TTI, although the control information (e.g. DCI) transmitted has at least some transmission parameters which would indicate a different TBS for a 1 ms TTI.

In some embodiments, identification of the long TTI TBS may be part of a process of generating a new table of short TTI TBS values based on a table 200 of long TTI TBS values. For example, a short TTI may be identified that may be used for a short PDSCH and/or a short PUSCH over an extended period, such that having a table of short TTI TBS values prepared in advance would be worth generating a storing an entirely new table. In other embodiments, identification of the long TTI TBS may be in response to a particular set of transmit parameters to be used for an upcoming transport block transmission within a short TTI. For example, a short TTI may be identified that may be used for a small number of transport blocks, such that generating an entirely new table solely for those few transport blocks would be inefficient. Other embodiments include downscaling one or more subsets of the long TTI TBS values from the table 200.

In one example, a communication device 110 may identify an MCS, modulation order, and a number of PRBs for upcoming transmission (e.g., two PRBs) of a transport block within a short TTI of 0.5 ms. Further, the communication device 110 may identify a TBS index of 1 based on this MCS and modulation order. The communication device 110 may then select a TBS using the number of assigned PRBs and the TBS index as indices ($I_{TBS}=1$, $N_{PRB}=2$) into the table 200 (which is used for transmitting transport blocks within a TTI of 1 ms) to obtain a TBS of 56 bits.

In this example, the number of symbols in the long TTI may be twelve, whereas the number of symbols in the short TTI may be six. To determine the size of the transport block within the short TTI, the communication device 110 may downscale the TBS of 56 bits by a scaling factor, a, that is based on a relation between the six short TTI symbols and the twelve long TTI symbols. For example, this scaling factor, a, may be given by a ratio between the number of symbols in the short and long TTIs, as follows:

$$\alpha = \frac{N_{data}^{SSF}}{N_{data}^{SF}},$$

wherein $N_{data}^{SSF}$ is the number of symbols in the short TTI, and $N_{data}^{SF}$ is the number of symbols in the long TTI. In this example, $\alpha=0.5$. Accordingly, downscaling based on $\alpha=0.5$ may result in the communication device 110 determining that the size of the transport block within the short TTI is half of 56 bits, which amounts to 28 bits. Thus, the short TTI TBS may be determined to be 28 bits.

In some aspects, the scaling of the transport block size based on a number of symbols in the short and long TTIs is based on the number of symbols used for data transmission in the short TTI and the number of symbols used for data transmission in the long TTI. Thus, the number of symbols is the number of symbols (e.g. OFDM symbols) used for data transmission, i.e in the short and long TTIs. The value of a is determined based on the number of data OFDM symbols in a SSF transmission compared to the number of data OFDM symbols in a SF:

In legacy PUSCH with normal cyclic prefix (CP)m the number of data OFDM symbols is 12. This is also the case for legacy PDSCH with 2 OFDM symbols used for PDCCH. For short TTI SSF with [1, 2, 3, 4, 5, 6, 7] data OFDM symbols the scaling factor then computes to $$\alpha = \left[\frac{1}{12} \frac{1}{6} \frac{1}{4} \frac{5}{12} \frac{1}{2} \frac{7}{12}\right].$$

Embodiments describe options for deriving the value of the scaling factor $\alpha$. The scaling factor is valid for both uplink and downlink transmissions of SSF in short TTI operation.

Embodiments describe downscaling the long TTI transport block size based on the ratio of the number of symbols in the short TTI and the number of symbols in the long TTI by applying a compensation factor of less than 1 to the ratio.

In some embodiments, the downscaling is further based on a number of REs allocated to control channel transmission within the short TTI. For example, an inband control channel may consume some number of REs allocated for data transmission. In some embodiments, this control channel overhead may be imposed regardless of the TTI duration. The communication device 110 may, for example, take into account what proportion of REs are used for control signaling as compared to the total number of REs during the short TTI (i.e., the number of symbols within the short TTI across all sub-bands allocated to the transmission). The total number of REs during the short TTI may be given by multiplying the number of symbols in the short TTI by the number of sub-bands allocated to the transmission by the number of subcarriers per sub-band (e.g., in most LTE systems, the number of subcarriers per sub-band is twelve). Accordingly, to compensate for the fractional overhead imposed by this control signaling, the communication device 110 may apply a compensation factor, $\beta$, of less than one. As one example, the compensation factor, $\beta$, may be given by:

$$\beta = 1 - \frac{C}{N_{data}^{SSF} 12M},$$

wherein C is the number of resource elements allocated to the control channel transmission within the short TTI, M is the number of sub-bands allocated to data transmission within the short TTI, and the constant 12 is the number of subcarriers per sub-band. Thus, in such embodiments, the scaling factor of the downscaling may be given by applying (e.g. multiplying) the compensation factor, $\beta$, to the ratio of the number of symbols in the short and long TTIs as follows:

$$\alpha = \left(\frac{N_{data}^{SSF}}{N_{data}^{SF}}\right)\beta.$$

The compensation factor $\beta > 1$ may correspond to 1 minus the fractional overhead taken into consideration. As one example the in-band downlink control, sPDCCH, can be taken into account with the compensating factor $\beta$.

As applied to the above example in which 56 bits was identified from the table 200, a compensation factor of 75% (i.e., to account for 15% of the resource elements in the short TTI being used for control signaling) would further downscale these 56 bits from 28 bits down to 21 bits. Thus, the short TTI TBS may be determined to be 21 bits.

Control signaling may not be the only form of overhead that embodiments of the present disclosure may account for in determining a size of the transport block within the short TTI. For example, some embodiments may also account for overhead imposed by CRC signaling. Thus, in some embodiments, the downscaling of the long TTI TBS may be further based on a number of bits used for a CRC. Accounting for CRC overhead may, for example, allow operation according to the short TTI to achieve a similar code rate to operation according to the long TTI. The similar code rate may, for example, allow the communication device 110 to retain functionality and/or compatibility with link adaptation algorithms and/or channel quality measurements/feedback regardless of whether the long TTI or the short TTI is used for transmission.

In some examples, with the scaling factor $\alpha$ as defined above, the scaled TBS table to be used for SSF transmission in short TTI operation can be found by scaling the legacy (e.g. long TTI) TBS table. A wanted result is that the achieved code rate for a given MCS is retained or is approximately constant, i.e. close to the legacy code rate. This may be done by including the CRC overhead in the determination of the short TTI TBS.

In some aspects, CRC is appended to the TBS table value before the transmission, so that the result is:

Code rate=(TBS table value+CRC)/transmitted bits, where transmitted bits is the number of transmitted data symbols, i.e. used RE times modulation order (bits per symbols). To achieve the same code rate we add the CRC before scaling the TBS, and then remove it again. This leads to the raw scaled TBS values for a SSF with short TTI operation:

$$TBS_{SSF\_raw} = (TBS+CRC)\alpha - CRC,$$

Note that TBS and $TBS_{SSF\_raw}$ may be matrices.

As such, in some embodiments, the communication device 110 may add the number of bits used for CRC to the long TTI TBS identified from the table before applying the above-discussed scaling and/or compensation factors, then subsequently subtract that number of CRC bits from the result. Thus, according to an example in which eight bits are used for CRC and the above-discussed scaling and compensation factors are applied, the selected 56 bits would be increased to 64 bits to include the eight CRC bits, would be halved to 32 bits according to the scaling factor, $\alpha=0.5$, further decreased to 24 bits by the compensation factor, $\beta=0.75$, then decreased to 16 bits by the eight CRC bits. Thus, the short TTI TBS may be determined to be 16 bits.

The number of bits produced by one or more of the calculations above may not be suitable for use as the short TTI TBS, in some embodiments. For example, in some embodiments, one or more of the calculations described above may produce a non-integer value for the short TTI TBS. As another example, one or more of the calculations described above may produce a value for the short TTI TBS that is not an integer number of bytes, e.g. not a multiple of 8 bits (which may be desirable in some embodiments). As another example, one or more of the calculations described above may not be aligned with a Quadrature Permutation Polynomial (QPP) interleaver size used by the communication device 110. In such examples, the communication device 110 may, according to embodiments, adjust the resultant number of bits from one or more of the above calculations to align the result with an integer number of bits, an integer number of bytes, and/or a QPP interleaver size.

To adjust the resultant number of bits, the communication device 110 may, in some embodiments, determine which long TTI TBS from the table 200 is closest to the number of bits produced by calculations described above, and select that closest long TTI TBS as the short TTI TBS. For example, the long TTI TBS values of the table 200 may represent values that align with the QPP interleaver size used by the communication device 110. As applied to the above example in which the long TTI TBS of 56 bits is downscaled to 16 bits, the communication device 110 may determine that the value 16 is present in the table 200, and therefore select 16 bits as the short TTI TBS. As applied to a different example in which the 56 bits is downscaled to, e.g., 31.5 bits, the communication device may determine that 32 bits is the closest TBS from the table 200, and instead select 32 bits as the short TTI TBS. In some examples, the short TTI transport block size is selected from a table comprising the long TTI transport block sizes and an additional transport block size. In some aspects, the additional transport block size is eight bits. As such, the communication device 110 may include a value of eight-bits in the table of allowed values, e.g., for purposes of determining which TBS from the table 200 is closest. This may allow the short TTI TBS to be smaller than the smallest TBS allowed for transport block transmission within the long TBS. In some aspects, the additional transport block size for short TTI is smaller than the smallest TBS transport block allowed for transmission within the long TTI TBS.

To ensure the two conditions above (short TTI TBS having an integer number of bytes and/or aligned with a QPP interleaver size), the closest TBS value present in the legacy (i.e. long TTI) TBS table may be used. This may be expressed as:

$$\text{TBSSSF } i = \text{TBS}j | \min \text{ abs}(\text{TBS}j - \text{TBSSSF\_raw } i) \text{ for every entry } i \text{ and } j = \text{any } i.$$

wherein TBS is TBS valued defined in Table 7.1.7.2.1-1 in 3GPP 36.213 release 10.13.0, and TBSSSF: The TBS values to be used in SSF for short TTI operation.

Figure 6:
FIG. 6 shows unique bit values of the legacy TBS set or table.

FIG. 6 shows an example 205 of the unique bit values of the legacy TBS table.

The resulting scaled TBS values from any example can then be used for transmission of the SSF in short TTI operation. That is for a given RB allocation and MCS index, a raw scaled value is found, for which the closest allowed TBS value is used.

As discussed above, the short TTI TBS may be determined in order to generate a new table of short TTI TBS values, e.g., similar to table 200 which is used for transport block transmission within a long TTI. Such embodiments may populate the new table with the determined short TTI TBS at the same indices as the long TTI TBS identified from table 200. Thus, in some embodiments, for a given $I_{TBS}$ and $N_{PRB}$, the appropriate TBS to use for transmission may be given by table 200 or the above-described new table based on whether a long or short TTI will be used, respectively. In some embodiments, the communication device 110 may configure transmission circuitry to transmit within the short TTI according to the determined short TTI TBS.

Further embodiments in a communication device 110 that additionally or alternatively configures receiver circuitry for transport block reception within the short TTI according to the short TTI TBS, e.g., through appropriate internal and/or external signaling. For example, the communication device 110 may receive a DCI format that explicitly or implicitly indicates the above-discussed set of transmission parameters, and may apply such parameters to perform processing that is complimentary to the above-discussed transmitter in order to receive one or more transport blocks within the short TTI. The communication device 110 transmitting the DCI may be the network node 110*a*, and the communication device 110 receiving the DCI may be the wireless device 110*b*.

Note that a communication device 110 as described above may perform the methods described herein any other processing herein by implementing any functional means, units, or modules. In one embodiment, for example, the communication device 110 comprises respective circuits or circuitry configured to perform the steps of method 300 shown in FIG. 3. The circuits or circuitry in this regard may comprise circuits dedicated to performing certain functional processing and/or may comprise one or more microprocessors in conjunction with memory. In embodiments that employ memory, which may comprise one or several types of memory such as read-only memory (ROM), random-access memory, cache memory, flash memory devices, optical storage devices, etc., the memory may store program code that, when executed by the one or more processors, carries out the techniques described herein.

In view of the above, FIG. 4 illustrates an example communication device 110*c* implemented in accordance with one or more embodiments. In some examples, the communication device 110*c* is a wireless device 110*b*. In other examples, the communication device 110*c* is a network node 110*a*, or a part of a network node 110*a*. In other examples, as shown, the communication device 110*c* includes processing circuitry 410 and communication circuitry 430. The communication circuitry 430 is configured to transmit and/or receive information to and/or from one or more other nodes, e.g., via any communication technology. Such communication may occur via one or more antennas that are either internal or external to the communication device 110*c*. The processing circuitry 410 is configured to perform processing described above, e.g., in FIG. 3, such as by executing instructions stored in memory 420. The processing circuitry 410 in this regard may implement certain functional means, units, or modules.

FIG. 5 illustrates an example communication device 110*d* implemented in accordance with one or more other embodiments. In some examples, the communication device 110*d* is a wireless device 110*b*. In other examples, the communication device 110*d* is a network node 110*a*, or a part of a network node 110*a*. As shown, the communication device 110*d* implements various functional means, units, or modules, e.g., via the processing circuitry 410 in FIG. 4 and/or via software code. These functional means, units, or modules, e.g., for implementing the method 300 in FIG. 3, include for instance an identifying unit or module 510 for identifying a long TTI transport block size from a table of long TTI transport block sizes used for transport block transmission within a long TTI. Also included is a determining unit or module 520 for determining a short TTI transport block size, used for transport block transmission within a short TTI, by downscaling the long TTI transport block size based on a relation between a number of symbols in the short TTI and a number of symbols in the long TTI that is greater than the number of symbols in the short TTI.

For example, the determining module is configured to downscale the long TTI transport block size based on a ratio of the number of symbols in the short TTI and the number of symbols in the long TTI.

For example, the identifying module is configured to identify the long TTI transport block size from the set of long TTI transport block sizes based on a set of transmit parameters to be used for an upcoming transport block transmission within the short TTI.

For example, the determining module is configured to downscale the long TTI transport block size based on a number of elements allocated to control channel transmission within the short TTI.

Figure 7:
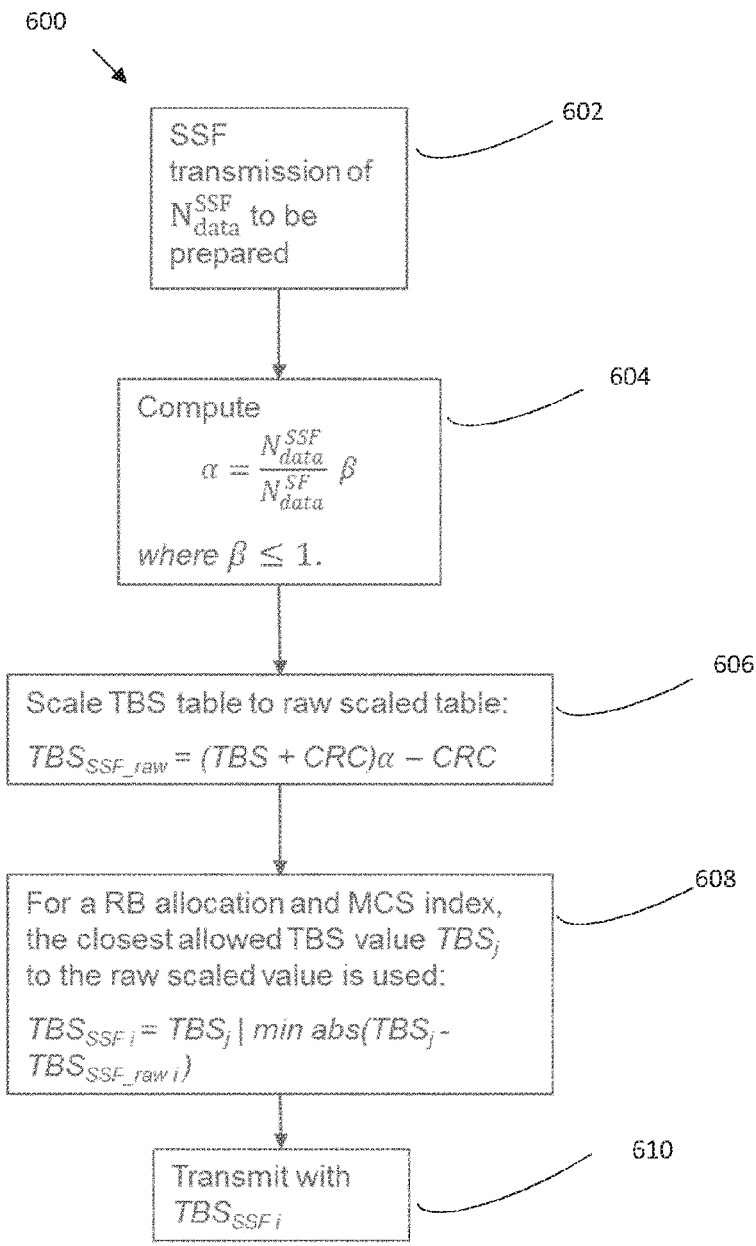
FIG. 7 is a flow diagram illustrating a further example method implemented by a communication device according embodiments of the present disclosure.

FIG. 7 shows an example method 600 of operation. The method 600 may be implemented by a network node 110*a*, part of a network node 110*a*, or a wireless device 110*b*.

In 602, the short TTI (i.e. SSF) transmission of a number of OFDM symbols in a certain SSF used for data transmission is prepared.

In 604, a computation or determination of the scaling factor α is made according to any example.

In 606, optionally, a long TTI TBS table value is scaled to account for CRC, according to any example.

In 608, optionally, a closest allowed TBS value is used, according to any example.

In 610, a transmission is made using the determined transport block size to be used for short TTI operation. In some aspects, the method 600 may comprise a network node 110*a* transmitting control information to the wireless device 110*b*, or the wireless device 110*b* receiving the control information from the network node 110*a*. The control information indicates transmission parameters which correspond to a 1 ms (long) TTI TBS value. In some aspects, the long TTI TBS value is determined from the transmission parameters, e.g. determined from the long TTI TBS table values. In examples of the method 604,606,608, the short TTI TBS value is determined from the 1 ms TTI TBS value, e.g. by scaling as described. The determined TBS value may be used for short TTI by the network node 110*a* for transmitting in downlink or receiving in uplink, and/or by the wireless device 110*b* for transmitting in uplink or receiving in downlink.

FIGS. 8A-8H show an example Transport block size table (dimension 34×110), corresponding to the table 200 shown in FIG. 2. In addition to the table 200, the table of FIGS. 8A-8H show additional long TTI TBS values with additional TBS index values and additional 5 numbers of PRB.

Those skilled in the art will also appreciate that embodiments herein further include corresponding computer programs.

Embodiments further include a computer program that comprises instructions which, when executed on at least one processor of a communication device 110, cause the communication device 110 to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of a communication device 110, cause the communication device 110 to perform as described above. The communication device 110 may be considered as carrying out the method, e.g. executing the computer program using a computing device or processing circuitry. References to a computing device may be considered as referring to the communication device 110, processing circuitry 410 and/or identifying/determining module 510,520.

Embodiments further include a computer program product comprising program code portions for performing the steps of any of the embodiments herein when the computer program product is executed by a communication device 110. This computer program product may be stored on a computer readable recording medium.

Other embodiments of the present disclosure may additionally or alternatively include aspects of the examples detailed in the appendix below. The present invention may be carried out in other ways than those specifically set forth herein without departing from the essential characteristics of the invention. For example, additional physical units or software modules may be included in the various embodiments to perform any of the additional functions discussed above. The present embodiments are to be considered in all respects as illustrative and not restrictive, and all changes coming within the meaning and equivalency range of the appended embodiments are intended to be embraced therein.

In some aspects, the disclosure provides a method performed by a communication device, the method comprising: identifying a long transmission time interval (TTI) transport block size from a table of long TTI transport block sizes used for transport block transmission within a long TTI; determining a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In some aspects, the disclosure provides downscaling the long TTI transport block size based on the relation between the number of symbols in the short TTI and the number of symbols in the long TTI comprises downscaling the long TTI transport block size based on a ratio of the number of symbols in the short TTI and the number of symbols in the long TTI.

In some aspects, the disclosure provides that downscaling the long TTI transport block size based on the ratio of the number of symbols in the short TTI and the number of symbols in the long TTI comprises applying a compensation factor of less than 1 to the ratio.

In some aspects, the disclosure provides that the table maps sets of transmit parameters to the long TTI transport block sizes used for transport block transmission within the long TTI.

In some aspects, the disclosure provides that the long TTI transport block size is identified from the table based on a set of transmit parameters to be used for an upcoming transport block transmission within the short TTI.

In some aspects, the disclosure provides that the set of transmit parameters comprises a number of assigned physical resource blocks.

In some aspects, the disclosure provides that the set of transmit parameters further comprises a modulation and coding index, and a modulation order; wherein identifying the long TTI transport block size comprises: determining a transport block size index based on the modulation and coding index and the modulation order; using the number of assigned physical resource blocks and the transport block size index as indices into the table to obtain the long TTI transport block size.

In some aspects, the disclosure provides that the downscaling of the long TTI transport block size is further based on a number of bits used for a cyclic redundancy check.

In some aspects, the disclosure provides that the downscaling is further based on a number of resource elements allocated to control channel transmission within the short TTI. In some aspects, the disclosure provides that the downscaling is based on a factor of:

$$\frac{N_{data}^{SSF}}{N_{data}^{SF}}\left(1 - \frac{C}{N_{data}^{SSF} 12M}\right);$$

wherein $N_{data}^{SSF}$ is the number of symbols in the short TTI; wherein $N_{data}^{SF}$ is the number of symbols in the long TTI; wherein C is the number of resource elements allocated to the control channel transmission within the short TTI; wherein M is a number of subbands allocated to data transmission within the short TTI.

In some aspects, the disclosure provides that determining the short TTI transport block size by downscaling the long TTI transport block size comprises selecting, as the short TTI transport block size, a further transport block size from the table that is closest to the downscaled long TTI transport block size.

In some aspects, the disclosure provides that at least one of the transport block sizes in the table is eight bits.

In some aspects, the disclosure provides determining a further short TTI transport block size for each further long TTI transport block size in the table by downscaling the further long TTI transport block size based on the relation between the number of symbols in the short TTI and the number of symbols in the long TTI.

In some aspects, the disclosure provides configuring transmission circuitry to transmit within the short TTI according to the determined short TTI transport block size.

In some aspects, the disclosure provides a communication device comprising: a processor and a memory, the memory containing instructions executable by the processor whereby the communication device is operative to: identify a long transmission time interval (TTI) transport block size from a table of long TTI transport block sizes used for transport block transmission within a long TTI; determine a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In some aspects, the disclosure provides the communication device configured to perform the method of any embodiment.

In some aspects, the disclosure provides a communication device configured to: identify a long transmission time interval (TTI) transport block size from a table of long TTI transport block sizes used for transport block transmission within a long TTI; determine a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In some aspects, the disclosure provides the communication device configured to perform the method of any embodiment.

In some aspects, the disclosure provides a communication device comprising: an identifying module configured to identify a long transmission time interval (TTI) transport block size from a table of long TTI transport block sizes used for transport block transmission within a long TTI; a determining module configured to determine a short TTI transport block size, used for transport block transmission within a short TTI, by downscaling the long TTI transport block size based on a relation between a number of symbols in the short TTI and a number of symbols in the long TTI that is greater than the number of symbols in the short TTI.

In some aspects, the disclosure provides the communication device configured to perform the method of any embodiment.

In some aspects, the disclosure provides a computer program, comprising instructions which, when executed on at least one processor of a communication device, cause the at least one processor to carry out the method according to any embodiments.

In some aspects, the disclosure provides a carrier containing the computer program, wherein the carrier is one of an electronic signal, optical signal, radio signal, or computer readable storage medium.

Aspects of the disclosure may use terms according to:

$N_{RB}^{SSF}$: The number of assigned RBs for the sPDSCH or sPUSCH scheduled on this SSF;

$N_{length}^{SSF}$: The length of a certain SSF, i.e., the number of OFDM symbols within a certain SSF;

$N_{length}^{SF}$: The length of a legacy TTI, corresponding to one SF duration of 1 ms. For the case of normal cyclic prefix, $N_{length}=14$; for the case of extended cyclic prefix, $N_{length}^{SF}=12$;

$N_{data}^{SSF}$: The number of OFDM symbols in a certain SSF used for data transmission.

$N_{data}^{SF}$: The number of OFDM symbols in a SF used for data transmission.

$N_{symbol,r}^{SSF}$: The number of reference symbols for a certain SSF for an uplink transmission;

α: A scaling factor for resource allocation for the sPDSCH or sPUSCH scheduled on this SSF;

CRC: The number of bits used for CRC insertion.

The invention claimed is:

1. A method performed by a communication device, the method comprising:
identifying a long transmission time interval (TTI) transport block size from a set of long TTI transport block sizes used for transport block transmission within a long TTI; and
determining a short TTI transport block size, used for transport block transmission within a short TTI, by downscaling the long TTI transport block size based on:
a relation between a number of symbols in the short TTI and a number of symbols in the long TTI that is greater than the number of symbols in the short TTI; and
a number of bits used for a cyclic redundancy check.

2. The method of claim 1, wherein the downscaling the long III transport block size comprises downscaling the long III transport block size based on a ratio of the number of symbols in the short III and the number of symbols in the long TTI.

3. The method of claim 1:
wherein the downscaling the long III based on the number of symbols in the short III is based on the number of symbols used for data transmission in the short TTI; and
wherein the downscaling based on the number of symbols in the long III is based on the number of symbols used for data transmission in the long III.

4. The method of claim 1, wherein the long TTI transport block size is identified using a set of transmit parameters for transport block transmission.

5. The method of claim 1, wherein the long TTI transport block size is identified from the set of long TTI transport block sizes based on a set of transmit parameters to be used for an upcoming transport block transmission within the short TTI.

6. The method of claim 5, wherein the set of transmit parameters comprises a number of assigned physical resource blocks.

7. The method of claim 6:
wherein the set of transmit parameters comprises a modulation and coding index, and a modulation order;
wherein identifying the long TTI transport block size comprises:
determining a transport block size index based on the modulation and coding index and the modulation order; and
using the number of assigned physical resource blocks and the transport block size index as indices into the set of long TTI transport block sizes to obtain the long TTI transport block size.

8. The method of claim 1, wherein the downscaling the long TTI transport block size is further based on a number of resource elements allocated to control channel transmission within the short TTI.

9. The method of claim 8, wherein the downscaling is based on a factor of:

$$\frac{N_{data}^{SSF}}{N_{data}^{SF}}\left(1 - \frac{C}{N_{data}^{SSF}12M}\right);$$

wherein $N_{data}^{SSF}$ is the number of symbols in the short TTI;
wherein $N_{data}^{SF}$ is the number of symbols in the long TTI;
wherein C is the number of resource elements allocated to the control channel transmission within the short TTI;
wherein M is a number of subbands allocated to data transmission within the short TTI.

10. The method of claim 1, wherein the determining the short TTI transport block size by downscaling the long TTI transport block size comprises selecting, as the short TTI transport block size, a further transport block size from the set of long transport block sizes that is closest to the downscaled long TTI transport block size.

11. The method of claim 1, wherein the short TTI transport block size is selected from a set comprising the long TTI transport block sizes and an additional transport block size.

12. The method of claim 1, further comprising determining a further short TTI transport block size for each further long TTI transport block size in the set of long TTI transport block sizes by downscaling the further long TTI transport block size based on the relation between the number of symbols in the short TTI and the number of symbols in the long TTI.

13. The method of claim 1, further comprising configuring transmission circuitry to transmit within the short TTI according to the determined short TTI transport block size.

14. The method of claim 1, wherein the identifying the long TTI transport block size from a set of long TTI transport block sizes comprises identifying the long TTI transport block size from a table of long TTI transport block sizes used for transport block transmission within a long TTI.

15. A communication device, comprising:
processing circuitry;
memory containing instructions executable by the processing circuitry whereby the communication device is operative to:
identify a long transmission time interval (TTI) transport block size from a set of long TTI transport block sizes used for transport block transmission within a long TTI; and
determine a short TTI transport block size, used for transport block transmission within a short TTI, by downscaling the long TTI transport block size based on:
a relation between a number of symbols in the short TTI and a number of symbols in the long TTI that is greater than the number of symbols in the short TTI; and
a number of bits used for a cyclic redundancy check.

16. The communication device of claim 15, wherein the downscaling the long TTI transport block size comprises downscaling the long TTI transport block size based on a ratio of the number of symbols in the short TTI and the number of symbols in the long TTI.

17. The communication device of claim 15, wherein the instructions are such that the communication device is operative to identify the long TTI transport block size from the set of long TTI transport block sizes based on a set of transmit parameters to be used for an upcoming transport block transmission within the short TTI.

18. The communication device of claim 15, wherein the downscaling is further based on a number of resource elements allocated to control channel transmission within the short TTI.

19. A non-transitory computer readable recording medium storing a computer program product for controlling a communication device, the computer program product comprising software instructions which, when run on processing circuitry of the communication device, causes the communication device to:
identify a long transmission time interval (TTI) transport block size from a set of long TTI transport block sizes used for transport block transmission within a long TTI; and
determine a short TTI transport block size, used for transport block transmission within a short TTI, by downscaling the long TTI transport block size based on:
a relation between a number of symbols in the short TTI and a number of symbols in the long TTI that is greater than the number of symbols in the short TTI; and
a number of bits used for a cyclic redundancy check.

* * * * *

UNITED STATES PATENT AND TRADEMARK OFFICE
CERTIFICATE OF CORRECTION

PATENT NO. : 10,863,381 B2
APPLICATION NO. : 16/337121
DATED : December 8, 2020
INVENTOR(S) : Wikström et al.

It is certified that error appears in the above-identified patent and that said Letters Patent is hereby corrected as shown below:

On the Title Page

On Page 2, item (56), under "OTHER PUBLICATIONS", in Column 1, Line 7, delete "Anahaim," and insert -- Anaheim, --, therefor.

In the Specification

In Column 4, Line 66, delete "according" and insert -- according to --, therefor.

In Column 6, Lines 64-65, delete "sub sub-frame (SSF)" and insert -- special subframe (SSF) --, therefor.

In Column 9, Line 11, delete "110a The" and insert -- 110a. The --, therefor.

In Column 10, Line 42, delete "i.e" and insert -- i.e., --, therefor.

In Column 11, Line 37, delete "$\beta>1$" and insert -- $\beta\leq1$ --, therefor.

In Column 15, Line 20, delete "additional 5" and insert -- additional --, therefor.

In Column 15, Line 46, delete "510,520." and insert -- 510, 520. --, therefor.

In Column 18, Line 3, delete "$N_{length}=14;$" and insert -- $N_{length}^{SF}=14;$ --, therefor.

In the Claims

In Column 18, Line 33, in Claim 2, delete "III" and insert -- TTI --, therefor.

In Column 18, Line 34, in Claim 2, delete "III" and insert -- TTI --, therefor.

Signed and Sealed this
Thirty-first Day of May, 2022

Katherine Kelly Vidal
*Director of the United States Patent and Trademark Office*

CERTIFICATE OF CORRECTION (continued)
U.S. Pat. No. 10,863,381 B2

In Column 18, Line 35, in Claim 2, delete "III" and insert -- TTI --, therefor.

In Column 18, Line 38, in Claim 3, delete "III" and insert -- TTI --, therefor.

In Column 18, Line 39, in Claim 3, delete "III" and insert -- TTI --, therefor.

In Column 18, Line 43, in Claim 3, delete "III" and insert -- TTI --, therefor.

In Column 18, Line 44, in Claim 3, delete "III." and insert -- TTI. --, therefor.

In Column 19, Line 2, in Claim 8, delete "III" and insert -- TTI --, therefor.

In Column 19, Line 4, in Claim 8, delete "III." and insert -- TTI. --, therefor.

In Column 20, Line 22, in Claim 17, delete "III" and insert -- TTI --, therefor.

In Column 20, Line 23, in Claim 17, delete "III" and insert -- TTI --, therefor.

In Column 20, Line 25, in Claim 17, delete "III." and insert -- TTI. --, therefor.

In Column 20, Line 29, in Claim 18, delete "III." and insert -- TTI. --, therefor.

In Column 20, Line 37, in Claim 19, delete "III" and insert -- TTI --, therefor.

In Column 20, Line 40, in Claim 19, delete "III" and insert -- TTI --, therefor.

In Column 20, Line 41, in Claim 19, delete "III," and insert -- TTI, --, therefor.

In Column 20, Line 42, in Claim 19, delete "III" and insert -- TTI --, therefor.

In Column 20, Line 43, in Claim 19, delete "III" and insert -- TTI --, therefor.

In Column 20, Line 44, in Claim 19, delete "III" and insert -- TTI --, therefor.